United States Patent

Meli et al.

[11] Patent Number: 5,995,259
[45] Date of Patent: *Nov. 30, 1999

[54] BIDIRECTIONAL OPTICAL TELECOMMUNICATION SYSTEM COMPRISING A BIDIRECTIONAL OPTICAL AMPLIFIER

[75] Inventors: Fausto Meli, Piacenza; Alessandro Cavaciuti, San Donato Milanese, both of Italy

[73] Assignee: Pirelli Cavi S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/585,476

[22] Filed: Jan. 16, 1996

[30] Foreign Application Priority Data

Jan. 27, 1995 [IT] Italy .................................. MI95A0143

[51] Int. Cl.⁶ .................................................. H04J 14/02
[52] U.S. Cl. ........................... 359/134; 359/113; 359/341; 385/24
[58] Field of Search ...................................... 359/113, 124, 359/127, 134, 160, 179, 341; 372/6; 385/24

[56] References Cited

U.S. PATENT DOCUMENTS

| | | | |
|---|---|---|---|
| 5,002,349 | 3/1991 | Cheung et al. | 350/96.13 |
| 5,365,368 | 11/1994 | Hsu et al. | 359/134 |
| 5,392,377 | 2/1995 | Auracher | 385/24 |
| 5,452,124 | 9/1995 | Baker | 359/341 |
| 5,574,589 | 11/1996 | Feuer et al. | 359/160 |
| 5,633,741 | 5/1997 | Giles | 359/124 |

OTHER PUBLICATIONS

Richard J. Orazi and Matthew N. McLandrich, Bidirectional Transmission at 1.55 Microns Using Fused Fiber Narrow Channel Wavelength Division Multiplexors and Erbium–Doped Fiber Amplifiers, IEEE Photonics Technology Letters, vol. 6, No. 4, Apr. 1994, pp. 571–574.

Chris W. Barnard, Jacek Chrostowski and Mohsen Kavehrad, Bidirectional Fiber Amplifiers, IEEE Photonics Technology Letters, vol. 4, No. 8, Aug. 1992, pp. 911–913.

Electronics Letters, Jul. 8, 1993, UK, vol. 29, No. 14 ISSN 0013–5194, pp. 1268–1270.

Electronics Letters, vol. 27, No. 12, Jun. 6, 1991, pp. 1065–1067 XP 000237765.

IEEE Photonics Technology Letters, Nov. 1994, USA, vol. 6, No. 11, ISSN 1041–1135, pp. 1335–1337.

*Primary Examiner*—Kinfe-Michael Negash
*Attorney, Agent, or Firm*—Norris, McLaughlin & Marcus; L. P. Brooks

[57] ABSTRACT

A bidirectional optical amplifier, comprising a unidirectional optical amplifying unit having one amplification wavelength band; two input/output ports for at least two optical signals having opposite propagation directions, said signals having a first and a second wavelength respectively, which are distinct from each other and included in said amplification wavelength band; two first and two second wavelength-selective optical couplers, having a first wavelength pass-band including said first wavelength and a second wavelength pass-band including said second wavelength respectively, said first and second wavelength pass-bands being devoid of relative overlappings, wherein said amplifying unit is connected between two opposite nodes of an optical bridge circuit, and wherein at the nodes of said bridge circuit said first and second selective optical couplers are present, in which said first and second selective couplers are disposed symmetrically to said amplifying unit and to said input/output ports of said optical signals.

14 Claims, 10 Drawing Sheets

FIG. 5
PRIOR ART
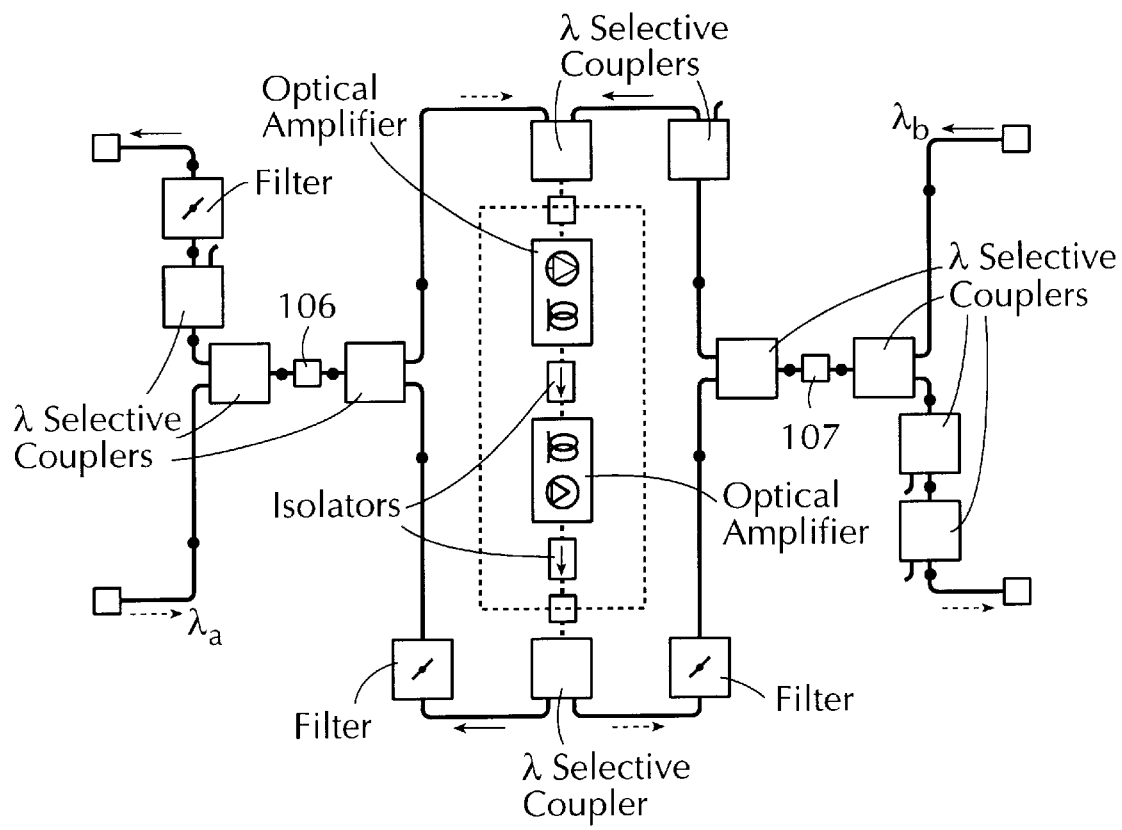
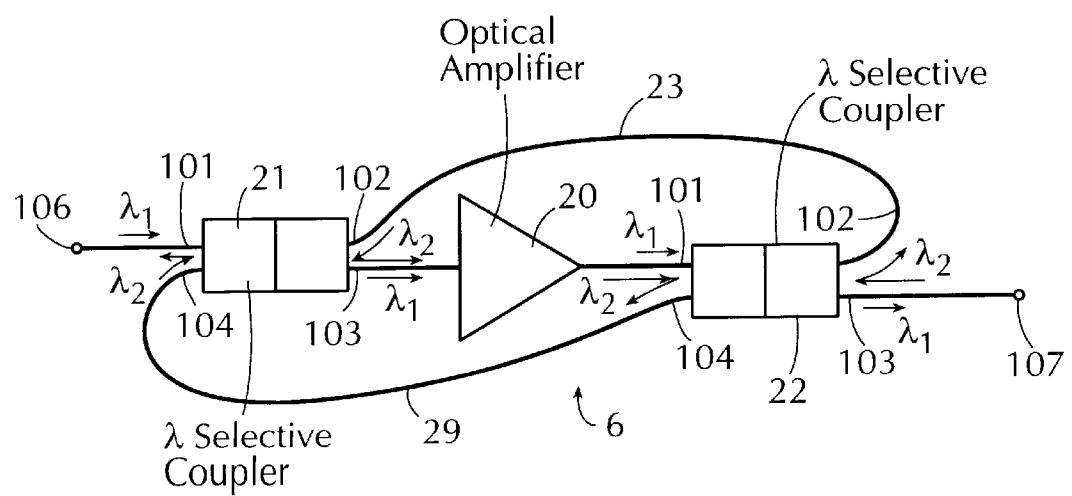
FIG. 6

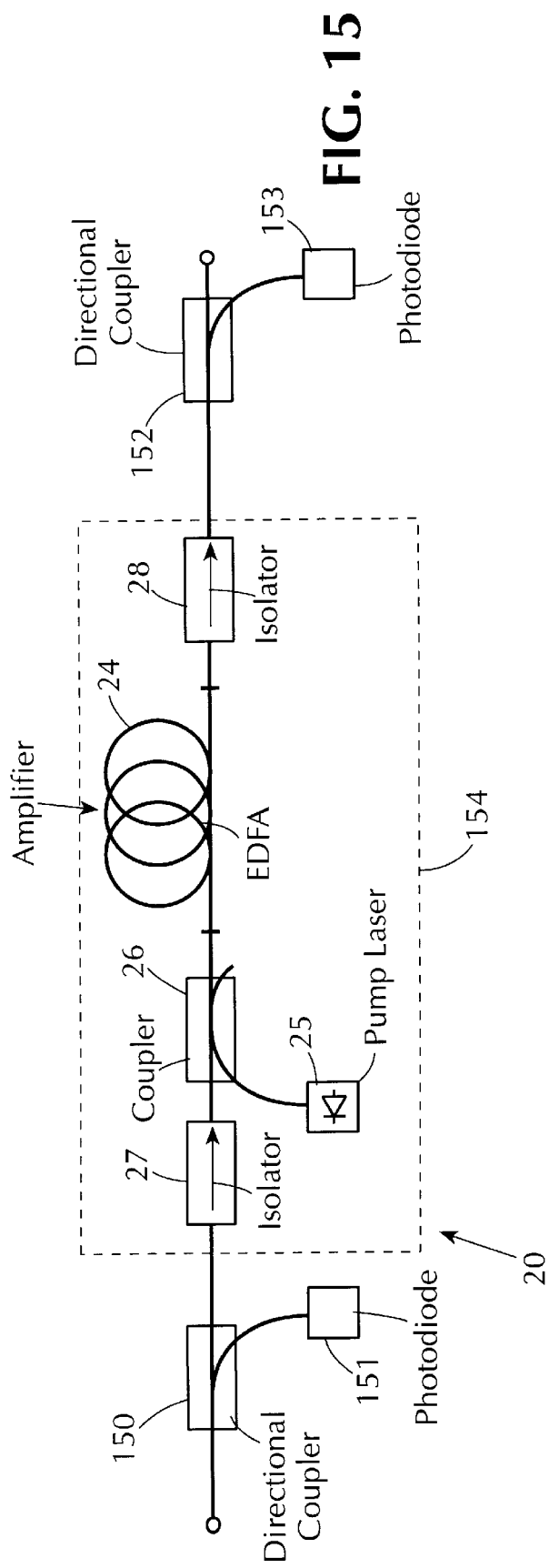
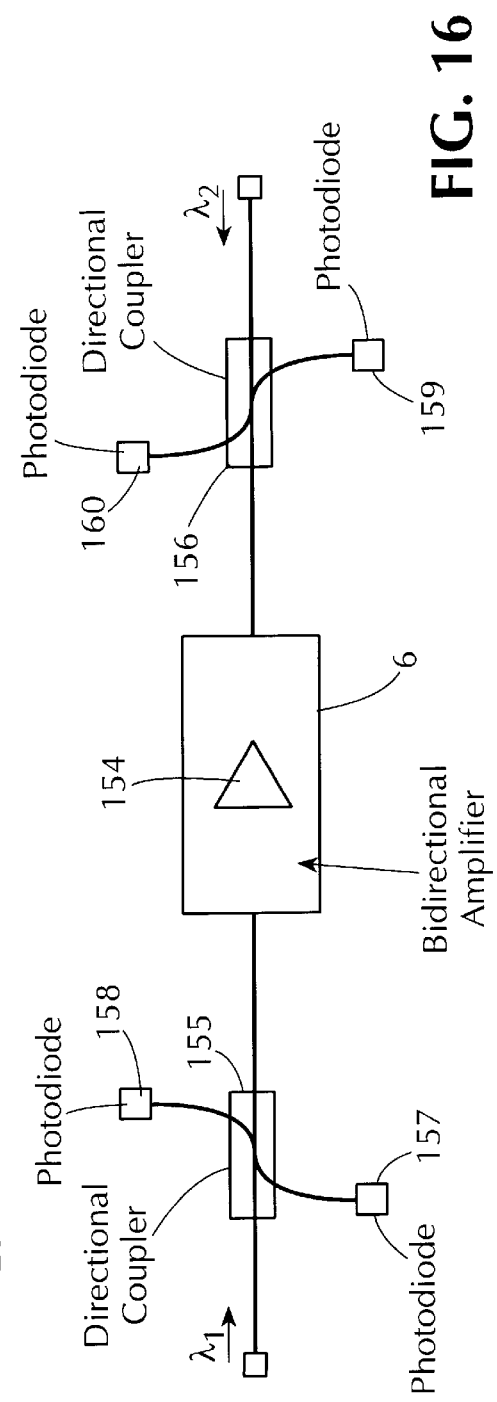

BIDIRECTIONAL OPTICAL TELECOMMUNICATION SYSTEM COMPRISING A BIDIRECTIONAL OPTICAL AMPLIFIER

BACKGROUND OF THE INVENTION

1. Field of the Invention

The present invention pertains to an optical-fibre bidirectional telecommunication system and to a bidirectional optical amplifier.

In recent times the use of optical fibres to send optical signals carrying the information to be remotely communicated has become well known in the telecommunication field.

Also known is the fact that optical signals sent over an optical fibre are submitted to an attenuation during their travel, which will make it necessary to amplify the signal so that it may cover the whole intended distance and reach the receiving station with a sufficient power level for a correct reception of the forwarded messages.

This amplification can be carried out by appropriate amplifiers located at predetermined intervals along the line, which amplifiers periodically raise the power of the transmitted optical signal.

For the purpose, optical amplifiers are conveniently used by which the signal is amplified while remaining in an optical form, that is in the absence of an optoelectronic detection and an electro-optical regeneration of same.

Such optical amplifiers are based on the properties of a fluorescent dopant (erbium for example) that, if suitably excited by administration of luminous energy, gives a high emission in the wavelength band corresponding to the minimum light attenuation in the silica-based optical fibres.

Such amplifiers are apparatus of the unidirectional type, that is in which the optical signal has a predetermined travel direction. This is due, as disclosed for example in U.S. Pat. No. 5,204,923 and U.S. Pat. No. 5,210,808 of the assignee of this applicant to the fact that optical amplifiers, in particular where high gain values are required, incorporate components of the unidirectional type, adapted to prevent signals reflected externally of the amplifiers from coming back to the amplifier itself, due for example to the Rayleigh scattering along the optical line fibres connected to the amplifiers.

As a consequence, a bidirectional transmission requires the use of two separate communication lines provided with respective amplifiers, each of which is used for communication in a single direction, which will result in a high cost for connection.

2. Related Art

Attempts have been made to achieve a bidirectional amplification with the use of a single unidirectional amplifier by exploiting the possibility offered by fluorescent-dopant amplifiers to amplify signals at different wavelengths in an independent manner. A bidirectional amplifier based on this principle is described in an article by S. Seikai et al.: "Novel Optical Circuit Suitable for Wavelength Division Bidirectional Optical Amplification" published in Electronics Letters, Vol. 29, No. 14, Jul. 8, 1993, pages 1268–1270. It is an apparatus which is located along an optical-fibre transmission line in which two signals of different wavelengths propagate in opposite directions and which consists of wavelength-selective couplers and a unidirectional doped-fibre amplifying unit of known type, connected to each other by portions of passive optical fibre. Both of the signal wavelengths are internal of the doped-fibre amplifying band. Through the selective couplers the two signals of different wavelength are admitted to different optical paths of travel. The two optical paths of travel only coincide at the portion corresponding to the amplifying fibre which is travelled over by the two signals in the same direction. The apparatus that will be described in more detail in the following, has a problem in terms of instability caused by internal reflections at an intermediate one of the wavelengths of the propagating signals, which problem can be only solved by the addition of filters, some of them being adjustable. As a result a very complicated structure is required and it is necessary to use devices for a continous and precise adjustment of said filters.

SUMMARY OF THE INVENTION

According to one aspect, the present invention relates to a bidirectional optical amplifier comprising:

an optical amplifying unit including at least one optical isolator, having an amplification wavelength band, two optical input and output ports for at least two optical signals having opposite propagation directions, said signals having a first and a second wavelength respectively, which wavelengths are distinct from each other and included in said amplification wavelength band, two first and two second wavelength-selective optical couplers, having a first wavelength passband including said first wavelength and a second wavelength passband including said second wavelength, said first and second wavelength passbands being devoid of relative overlappings, said amplifying unit being connected between two opposite nodes of an optical bridge circuit, to the other opposite nodes of which said input and output ports are connected, at the nodes of said bridge circuit first and second optical selective couplers being present, characterized in that said first and second selective couplers are disposed symmetrically to said amplifying unit and said input and output ports of said optical signals.

In a preferential formulation said amplifying unit includes at least one erbium-doped optical fibre.

Preferentially, the fibre comprises alumina and germanium among the dopants; most preferably the fibre comprises alumina, germanium and lanthanum among the dopants.

Said passband of the selective couplers advantageously is at least 10 nm wide.

In a particular formulation, at least one of said passbands comprises at least two signals of distinct wavelengths.

In a preferential formulation the wavelength-selective couplers have a figure of merit equal to or higher than 0.5.

According to a second aspect, the present invention relates to a bidirectional optical amplifier comprising:

an optical amplifying unit including at least one optical isolator, having an amplification wavelength band, two optical input and output ports for at least two optical signals having opposite propagation directions, said signals having a first and a second wavelength respectively, which are distinct from each other, at least two wavelength-selective optical couplers, having a wavelength passband including said first wavelength and a wavelength reflected-band including said second wavelength, said wavelength bands being devoid of relative overlappings, said amplifying unit being connected between two opposite nodes of an optical bridge circuit, to the other opposite nodes of which said input and output ports are connected, said bridge circuit forming at least one feedback loop including said amplifying unit and no more than three of said couplers, characterized in that the arrangement of said wavelength-selective couplers is such that each of said feedback loops has an overall attenuation greater than the amplifier gain at each wavelength included in said amplifying band, in the presence of a reflectivity of at least 15 dB at one of said inlet and outlet ports, in the absence of filter means.

In a preferential formulation of said second aspect of the present invention, said bidirectional optical amplifier is characterized in that the optical bridge circuit comprises two wavelength-selective couplers having a first passband and two wavelength-selective couplers having a second passband, located at the nodes of the circuit itself, in which the couplers are disposed symmetrically to the amplifying unit.

According to another aspect, the present invention relates to a bidirectional optical amplifier comprising:

an optical amplifying unit including at least one optical isolator, having an amplification wavelength band, two input and output ports for at least two optical signals having opposite propagation directions, said signals having a first and a second wavelength respectively, which wavelengths are distinct from each other and included in said amplification wavelength band, two wavelength-selective optical couplers of one type and two wavelength-selective optical couplers of a second type, respectively having a first wavelength passband including said first wavelength and a second wavelength passband including said second wavelength, said first and second wavelength passbands being devoid of relative overlappings, and respectively having one wavelength reflected-band including said second wavelength and a second wavelength reflected-band including said first wavelength, having each one common-access fibre, one access fibre carrying at its output the signals included in said wavelength passband and one access fibre carrying at its output the signals included in said wavelength reflected-band, characterized in that a first input/output port is connected to the common fibre of a first selective coupler of the first type; the fibre carrying at its output the signals included in said passband of the first selective coupler of the first type is connected to the fibre carrying at its ouput the signals included in said reflected band of a first selective coupler of the second type; the fibre carrying at its output the signals included in said reflected band of the first selective coupler of the first type is connected to the fibre carrying at its output the signals included in said passband of a second selective coupler of the second type, the unidirectional amplifying unit is connected between the common fibre of the first selective coupler of the second type and the common fibre of the second selective coupler of the second type, so that the optical isolator enables passage of radiation in the direction from the first to the second selective couplers of the second type; the fibre carrying at its output the signals included in said passband of the first selective coupler of the second type is connected to the fibre carrying at its output the signals included in said reflected band of a second selective coupler of the first type; the fibre carrying at its output the signals included in said reflected band of the second selective coupler of the second type is connected to the fibre carrying at its output the signals included in said passband of a second selective coupler of the first type; the common fibre of a second selective coupler of the first type is connected to a second input/output port.

According to a further aspect, the present invention relates to a bidirectional telecommunication method, comprising:

generating a first optical signal and a second optical signal, at first and second wavelengths respectively, in a first and a second transmitting station;

introducing said first and second signals into the opposite ends of an optical fibre of a telecommunication line, respectively;

amplifying said first and second signals at least once in an optical amplifier disposed intermediate the line;

receiving said first and second signals to respective first and second reception stations, at the opposite end of said optical fibre relative to said first and second transmitting stations; in which said step of amplifying said first and second signals is accomplished in a single optical amplifier including a fibre amplifying unit comprising an optical isolator, and comprising:

transmitting each of said signals at least once through a first wavelength-selective optical coupler, and reflecting each of said signals at least once through a second wavelength-selective optical coupler, both upstream and downstream of the amplifying unit, characterized in that said transmitting and reflecting steps take place in the same sequence for each of said signals.

BRIEF DESCRIPTION OF THE DRAWINGS

More details will be found in the following description, with reference to the accompanying drawings, in which:

FIG. 5 is a diagram showing a bidirectional optical amplifier according to the known art;

FIG. 6 is a diagram of a bidirectional optical amplifier used in experiments by the Applicants;

FIG. 15 is a diagram of a unidirectional amplifying unit that can be used in the bidirectional amplifier of the invention;

FIG. 16 is a diagram of a monitoring and control system for a bidirectional optical amplifier.

DESCRIPTION OF PREFERRED EMBODIMENTS

Figure 1:
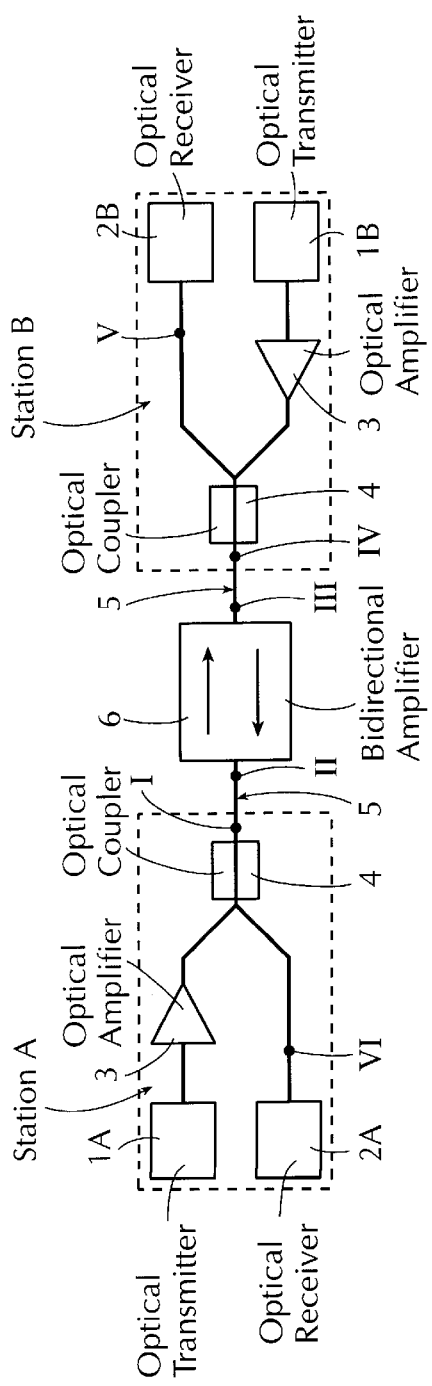
FIG. 1 is a diagram of a bidirectional transmission line according to the invention.

As shown in FIG. 1, a bidirectional optical telecommunication line according to the present invention comprises two end stations A and B, each of which consists of a respective transmitting station 1A, 1B and a respective receiving station 2A, 2B.

In particular, the transmitting station 1A comprises a laser transmitter having a first wavelength $\lambda_1$ (of 1533 nm, for example) and a transmitting station 1B comprising a laser transmitter having a wavelength $\lambda_2$ (of 1556 nm, for example).

Transmitters 1A, 1B are transmitters modulated either directly or through an external modulation according to the line requirements, in particular in connection with the chromatic dispersion of the optical line fibres, the length of same and the foreseen transmission speed.

The output of each of the transmitters 1A, 1B is sent to the input of a respective booster 3 and from the latter to an input of a coupler 4 which is selective among the respective wavelengths of said laser transmitters 1A, 1B.

The output of the selective coupler 4, on which the two wavelengths $\lambda_1$ and $\lambda_2$ are multiplexed together in the same fibre, is connected to an end portion of an optical line 5 comprising an optical fibre connecting the two end stations A and B to each other.

The optical fibre of the optical line 5 is usually a single-mode fibre either of the step index (SI) type or of the dispersion shifted type, conveniently introduced into an appropriate optical cable, and its overall length is some ten (or hundred) kilometers between each amplifier, until the desired connection distance is covered.

Interposed along line 5 is a bidirectional optical amplifier according to the present invention, generally denoted by 6.

Although in the present description only one optical amplifier is indicated, several optical amplifiers in succession can be present depending on the overall length of the optical connection and the powers in the different portions thereof; for example, a fibre portion included between an end station and an amplifier, or between two successive amplifiers, can be about 100 kilometers long.

Should the optical signals to be transmitted be generated by signal sources having transmitting features of their own (in terms of wavelength, type of modulation, power) and different from those provided for the described connection, each transmitting station 1A, 1B would be comprised of a respective interfacing unit, adapted to receive the external optical signals of origin and to detect and regenerate them again with new features adapted to the transmission system.

In particular, said interfacing units generate respective optical work signals having wavelengths $\lambda_1$, $\lambda_2$ (also referred to, for the sake of brevity, as "$\lambda_1$ signal" and "$\lambda_2$ signal"), adapted to the system requirements, as described in the following.

In U.S. Pat. No. 5,267,073 of said assignee the description of which is herein incorporated by reference, interfacing units are described which in particular comprise a transmission adapter adapted to convert an optical input signal to the appropriate form for the optical transmission line, and a reception adapter adapted to convert the transmitted signal to the appropriate form for a receiving unit.

For use in the system of the present invention, the transmission adapter preferably comprises as the laser generating an output signal, a laser of the external modulation type.

Figure 2:
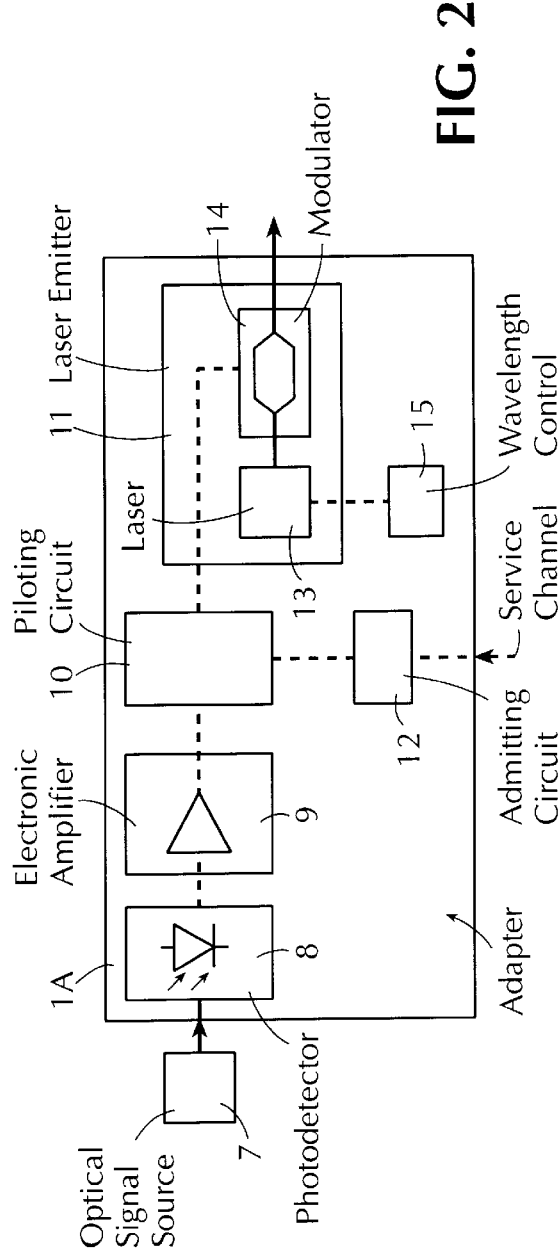
FIG. 2 is a diagram of an interfacing unit for the line according to the invention.

A diagram showing an interfacing transmission unit, of the type adapted for use within the present invention is illustrated in FIG. 2, in which for the sake of clarity optical connections are represented in solid line and electrical connections in broken line.

The optical signal from an external source 7 is received by a photodetector (photodiode) 8 emitting an electric signal which is fed to an electronic amplifier 9.

The electric output signal from amplifier 9 is fed to a piloting circuit 10 of a modulation laser emitter, generally denoted by 11, adapted to generate an optical signal at the previously selected wavelength, containing the information of the input signal.

Conveniently, an admitting circuit 12 of a service channel can be connected to the piloting circuit 10.

The modulation laser emitter 11 comprises a continuous-emission laser 13 and an external modulator 14, of the Mach-Zender type for example, piloted by the output signal of circuit 10.

A circuit 15 verifies the emission wavelength of laser 13, keeping it constant to the previously selected value by compensating for possible external perturbations such as temperature and the like.

Interfacing reception units, of the stated type, are described in the above mentioned patent and available from the Applicant under the trade name TXT/E-EM.

Alternatively, the laser transmitters 1A, 1B may be laser transmitters operating at the selected wavelengths, using DFB 1533 and 1556-nm lasers. In transmission experiments described in the following, use has been made in particular of a DFB 1533-nm laser, directly modulated at 2.5 Gbit/s, incorporated with the receiver into the end apparatus SDH model SLX-1/16, commercialized by PHILIPS NEDERLAND BV, 2500 BV,'s Gravenhage (NL), and a DFB 1556-nm laser of the continuous emission type, produced by ANRITSU CORP., 5-10-27 Minato-ku, Tokyo (JP).

Referring to FIG. 1, boosters 3 raise the level of the signals generated by transmitters 1A, 1B until a value sufficient to enable said signals to travel over the subsequent optical fibre portion existing before the receiving station or the amplifying means are reached, while keeping a sufficient power level at the end to ensure the required transmissive quality.

To the ends of the present invention and for the above use, booster 3 is for example an optical fibre amplifier of a commercially available type, having the following features:

| | |
|---|---|
| input power | −5 to +2 dbm |
| output power | 13 dbm |
| work wavelength | 1530–1560 nm. |

An appropriate model is TPA/E-12, available from said assignee.

The selective couplers 4 are optical components adapted to convey two optical signals at different wavelengths to a single output fibre and to separate two overlapped signals in a single input fibre onto two optical output fibres respectively, depending on the respective wavelengths. Said selective couplers are required to have a passband width adapted to enable a separation of the signals in the two directions, in the absence of crosstalk.

Figure 3A:
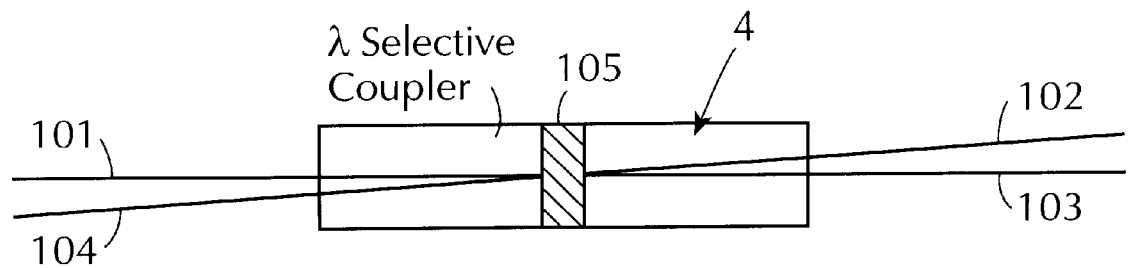
FIG. 3 is a diagram of a selective reflection coupler for use in bidirectional amplifiers and a spectral transmission curve of same.

The selective couplers 4 can preferentially be of the type diagrammatically shown in detail in FIG. 3A; they have four optical access fibres (input or output ports) identified by 101, 102, 103, 104 respectively and contain a selective reflecting component 105 in the middle portion thereof, which reflecting component behaves like a band-pass element in transmission and a band-elimination element in reflection; i.e. this component is adapted to enable passage of the signals having a wavelength within a predetermined band and to reflect the signals the wavelengths of which are external of said band. An input signal to fibre 101 of the selective coupler, of a wavelength $\lambda_p$ internal to the passband of component 105 for example, is transmitted without important attenuation towards fibre 103 and, likewise, $\lambda_p$ signals are transmitted from fibre 104 to fibre 102 or symmetrically from fibre 103 to fibre 101 and from fibre 102 to fibre 104. An input signal to fibre 101, of a wavelength kr external to such a band, is on the contrary reflected towards fibre 104 and likewise, $\lambda_r$ signals go from fibre 102 towards fibre 103 and symmetrically from fibre 104 towards fibre 101 and from fibre 103 towards fibre 102.

Figure 3B:
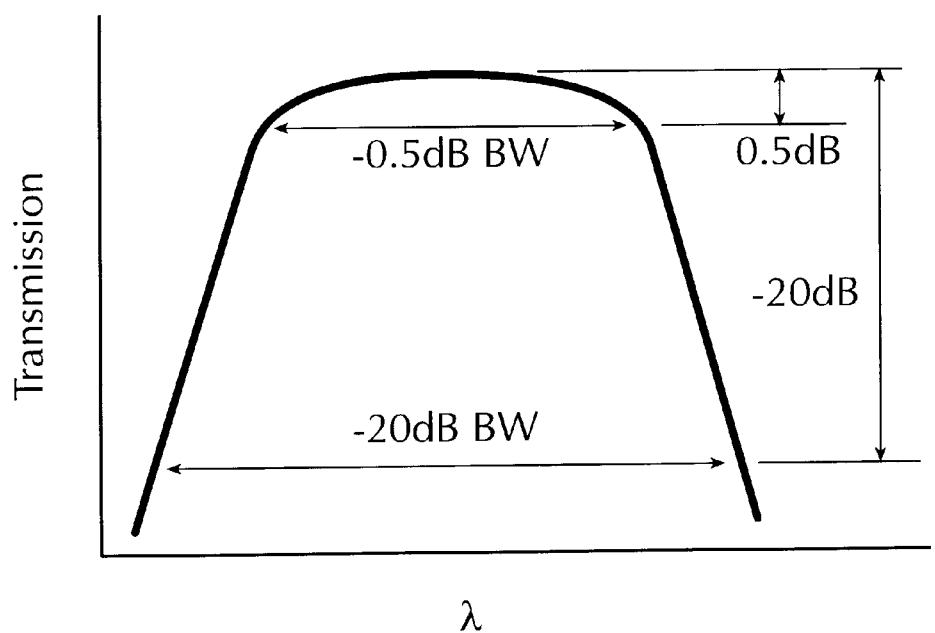

Referring to FIG. 3B, in the following it will be indicated as the passband of the selective reflecting component 105 or, by extension, as the passband of the selective coupler, a band the wavelengths of which are close to a minimum-attenuation wavelength in transmission and to which, in transmission through the selective reflecting component 105, an attenuation not greater than 0.5 dB in addition to the minimum attenuation, corresponds. The width of this passband is shown in FIG. 3B as "−0.5 dB BW".

In the same manner, in the following it will be indicated as the reflected band of the selective reflecting component 105 or, by extension, as the reflected band of the selective coupler, a band the wavelengths of which are close to a minimum-attenuation wavelength in reflection and to which in reflection by the selective reflecting component 105, an attenuation not greater than 0.5 dB in addition to the minimum attenuation, corresponds.

The selective couplers have been such selected that at least part of their passband and at least part of their reflected band is contained within the amplifying band of the bidirectional amplifying unit 6 and that wavelengths $\lambda_1$ and $\lambda_2$ are included in said passband and reflected band, respectively.

While described with four access fibres, the selective couplers adapted for the above use may have three access fibres only, the fourth (the one denoted by 104 for example) staying unused.

By way of example, an appropriate selective coupler is model WD1515AY-A3, commercialized by JDS FITEL INC., Heston Drive, Nepean, Ontario (CA), the structure of which corresponds to the description made with reference to FIG. 3A, with the only variant that three access fibres 101, 102, 103 are provided.

Figure 4A:
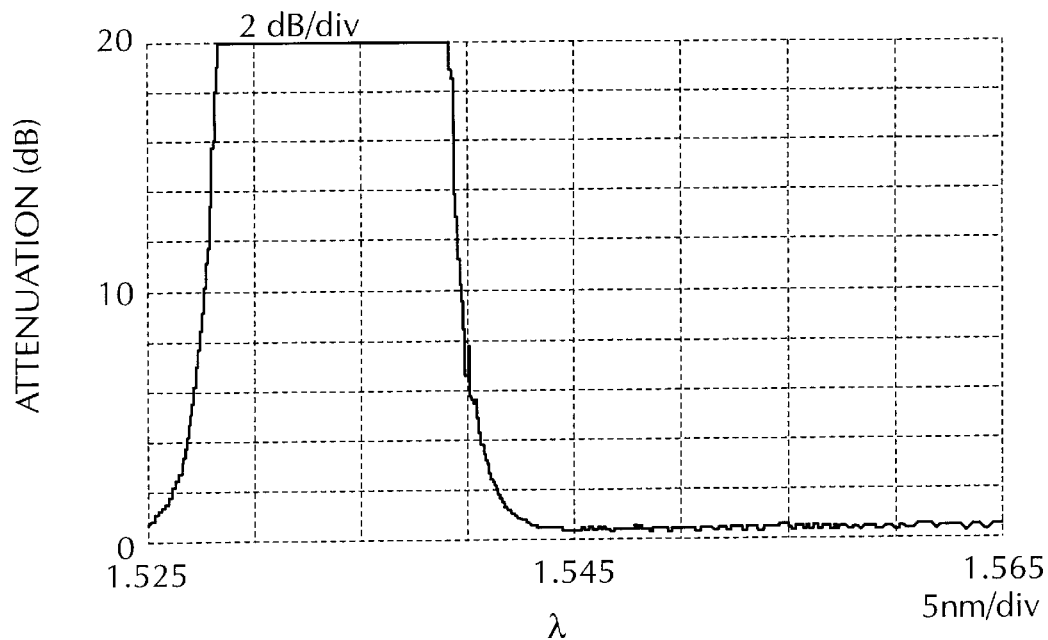
FIG. 4 shows the spectral attenuation curves of the transmitted signals between two pairs of access fibres of a selective reflection coupler of a first type.
Figure 4B:
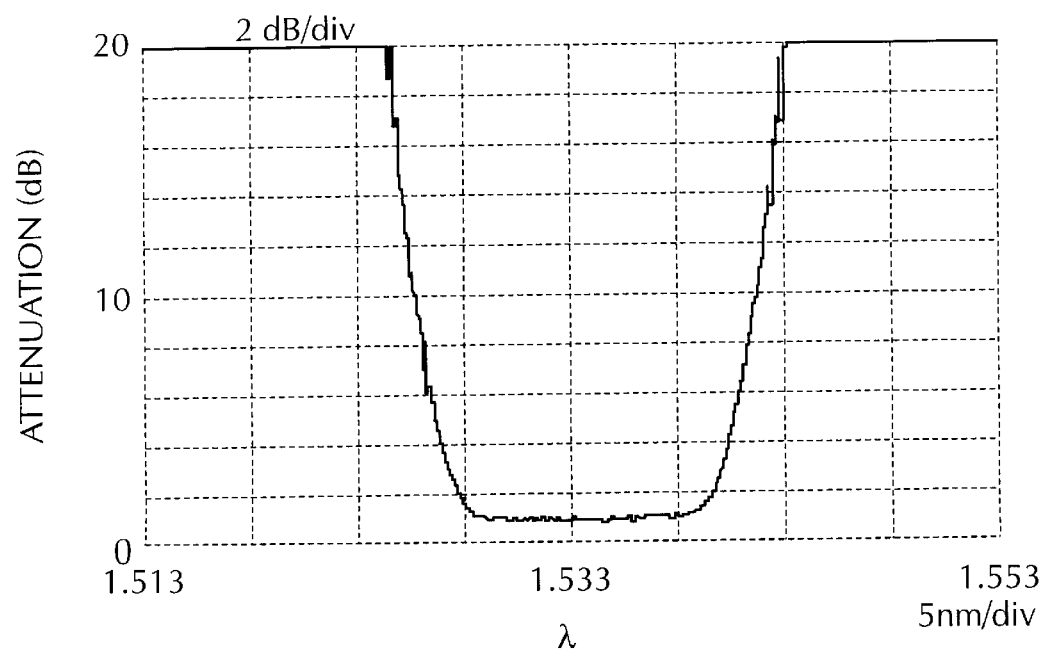

The relative spectral attenuation curves are reproduced in FIGS. 4A and 4B.

The curves show the attenuation undergone, on varying of the wavelength, by the signal inputted to a given fibre of the selective coupler during propagation until a given output fibre. Curve 4A in particular relates to the case of propagating signals between fibres 102 and 103 and shows an important attenuation (>20 dB) for wavelengths included in a band of about 10 nm centered on 1533 nm, and a very small attenuation (about 0.5 dB) for wavelengths greater than 1543 nm. Curve 4B, relating to the case of propagating signals between fibres 101 and 103, is symmetrical relative to the preceding one and shows a very small attenuation (about 0.7 dB) for wavelengths included in a band of about 10 nm centered on 1533 nm and an important attenuation (>20 dB) for wavelengths greater than 1543 nm.

For the selective coupler of the stated model the width of the above defined passband is about 10 nm.

By analogy, referring to FIG. 3B it is therein indicated as the passband at −20 dB of the selective coupler, a wavelength band to which an attenuation not greater than 20 dB in addition to the minimum attenuation corresponds, in transmission through the selective coupler.

The width of this passband at −20 dB ("−20 dB BW" in FIG. 3B) is instead about 20 nm for the selective coupler of the stated model.

The figure of merit (F.O.M.) of the selective coupler, defined as the ratio of the passband width to the passband width at −20 dB, is about 0.5 for the selective coupler of the stated model.

Reproduced in FIG. 5 is the diagram of a known bidirectional wavelength-divison amplifier, described in the above mentioned article in Electronics Letters by S. Seikai et al. The diagram is drawn from FIG. 1 of the article.

The device comprises an optical unidirectional amplifying unit EDFA, four wavelength-selective optical couplers WSC1, WSC8, WSC9, WSC2 and two optical connectors 106, 107.

The amplifying unit EDFA shown in the figure of the article consists of two stages of erbium-doped fibre, with a first optical isolator inserted between the two stages and the second optical isolator inserted at the second stage output, both denoted by ISO in the diagram.

The wavelength-selective optical couplers are identified in the article as types JDS1535 (WSC1, WSC2) and JDS1550 (WSC8, WSC9).

According to the article, there is no distinction in use between the two types.

The selective couplers WSC have two channels at wavelengths $\lambda_a$ and $\lambda_b$, in the neighbourhood of 1.533 and 1.550 μm.

The amplifying circuit identified as included between connectors 106, 107, is a bridge circuit, in which, by virtue of the selective coupler WSC properties, the two optical counter-propagating signals at different wavelengths pass through the amplifying unit EDFA in the same direction.

The article reproduces the consideration that this simple configuration, using four commercially available (not distinct from each other) selective couplers WSC can operate in the case of amplifiers of a gain lower than 25 dB, whereas for gains higher than 30 dB the circuit becomes unstable due to the losses through the selective couplers. In order to solve this problem, the article suggests the use of another selective coupler WSC4, of the JDS1535 type, in the input branch at 1.55 μm of the loop, and two optical tunable filters TOF1 and TOF2 in the input branches for reducing the spontaneous-emission noise; if said filters are replaced by selective couplers WSC, the system becomes unstable at 1.54 μm, at crossing of the selective coupler passbands.

The addition of further selective optical couplers as suggested, makes the structure much more complicated. Furthermore, the use of filters of the tunable type which need a precise and continuous adjustment, and therefore the use of other check means makes the practical completion of the suggested configuration still more difficult.

The device generally identified by 6 in the diagrammatic representation shown in FIG. 6 corresponds to a bidirectional amplifier according to one configuration used in experiments by the Applicants.

It comprises one unidirectional amplifying unit, denoted by 20, to be described in the following, two wavelength-selective optical couplers 21 and 22, corresponding to the coupler 4 show in FIG. 3A, two optical connectors 106, 107 and portions 23, 29 of passive optical fibre.

As shown in FIG. 6, connector 106 is connected to fibre 101 of the selective coupler 21. Connection between fibre 102 of the selective coupler 21 and fibre 102 of the selective coupler 22 is made by a fibre 23 and connection between fibre 104 of the selective coupler 21 and fibre 104 of the selective coupler 22 is made by a fibre 29. The unidirectional amplifying unit 20 is connected between fibre 103 of the selective coupler 21 and fibre 101 of the selective coupler 22, so that the operation direction of said unit is the one going from the selective coupler 21 to the selective coupler 22. Finally, connector 107 is connected to fibre 103 of the selective coupler 22.

The unidirectional amplifying unit 20 is an optical amplifying unit, preferably of the optical line amplifier type, characterized by an amplifying wavelength band within which the operation wavelengths $\lambda_1$ and $\lambda_2$ in both directions of the bidirectional amplifier 6 are selected; an appropriate line amplifier is for example the one commercialized by said assignee under the trade name OLA/E-MW to be described in detail in the following.

The selective couplers 21, 22 are of the type described with reference to FIG. 3A.

The selective couplers are such selected that at least part of their passband and at least part of their reflected band is contained within the amplifying band of the amplifying unit, and that wavelength $\lambda_1$ is within said passband and wavelength $\lambda_2$ is within the reflected band of same.

Appropriate selective couplers are for example model WD1557AY-4, produced by the above mentioned JDS FITEL: it is a model like the previously mentioned model WD1515AY-A3, which however is provided with the four access fibres 101, 102, 103, 104. The relevant spectral attenuation curves between fibres 101 and 104 and between fibres 102 and 103 are pratically identical with those reproduced in FIG. 4A. Likewise, the spectral attenuation curves between fibres 101 and 103 and between fibres 102 and 104 are pratically identical with those reproduced in FIG. 4B. For this selective coupling model too the figure of merit (F.O.M.) has a value of about 0.5.

The optical connectors 106, 107 can be series SPC, produced by SEIKON GIKEN, 296-1 Matsuhidai, Matsudo, Chiba (JP).

Referring to FIG. 6, in the case of the selective coupler 21, an input signal of wavelength $\lambda_1$ to the access fibre 101a passes through the selective coupler unchanged and comes out of fibre 103a; an input $\lambda_2$ signal to fibre 104a, is reflected and sent at the output to fibre 101a; an input $\lambda_2$ signal to fibre 102 is reflected and sent at the output to fibre 103a. Likewise, in the case of the selective coupler 22, in the presence of input signals to the access fibre 101a, at wavelength $\lambda_1$ and wavelength $\lambda_2$, the $\lambda_1$ signal passes through the selective coupler unchanged and comes out of fibre 103b, whereas the $\lambda_2$ signal is reflected and sent at the output to fibre 104; an input $\lambda_2$ signal to fibre 103b is reflected and sent at the output to fibre 102. The $\lambda_2$ signal from the transmission line through connector 107 therefore undergoes two reflections (22 and 21), is amplified in the amplifying unit 20 and undergoes two further reflections (22 and 21), before coming out of connector 106. The $\lambda_1$ signal from the transmission line through connector 106, instead, is transmitted through the selective coupler 21, amplified and then transmitted through the selective coupler 22.

The device is therefore capable of simultaneously amplifying the signals at the two wavelengths in either direction.

At each transmission passage therethrough, the selective coupler behaves as a band-pass filter (as shown in FIG. 4B) thereby removing the spontaneous emission at the wavelengths intermediate between $\lambda_1$ and $\lambda_2$ propagating together with the signals. On the contrary, at each reflection the selective coupler behaves as a band-elimination filter (FIG. 4A) and does not attenutate the spontaneous emission.

By inserting the above described bidirectional amplifier 6 in an optical connection according to the diagram shown in FIG. 1, in which transmitter 1A works at 1533 nm and transmitter 1B works at 1556 nm, by an attenuation of 26.7 dB in each of fibres 5, the powers at positions I. II, III, IV, V, VI shown in FIG. 1 have been determined. They are summarized in the following Table 1.

TABLE 1

| | Power (dbm) | |
|---|---|---|
| Position | $\lambda_1$ = 1533 nm | $\lambda_2$ = 1556 nm |
| I | +11 | −19 |
| II | −15.7 | +7.7 |
| III | +7.7 | −15.7 |
| IV | −19 | +11 |
| V | −20 | |
| VI | | −20 |

An alternative version of a bidirectional optical amplifier according to the present first configuration is achieved by modifying the present configuration through the use of selective couplers 21', 22' such selected that wavelengths $\lambda_1$ and $\lambda_2$ are included in the respective reflected and passbands and through the simultaneous reversal of the propagation direction of $\lambda_1$ and $\lambda_2$ signals, that is by connecting the optical connector 106 to the transmission line segment from which the $\lambda_2$ signal comes and the optical connector 107 to the transmission line segment from which the $\lambda_1$ signal comes.

Figure 7:
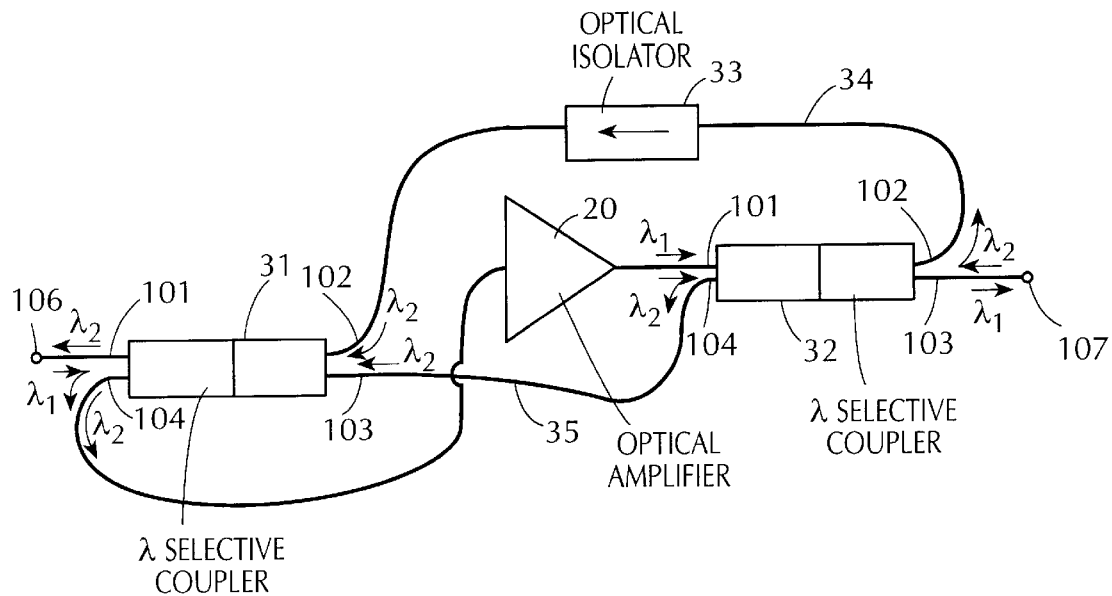
FIG. 7 shows a detail diagram of a bidirectional optical amplifier in one embodiment of the invention.

Referring to FIG. 7. a second configuration of a bidirectionalal amplifier used in experiments by the Applicant includes two selective optical couplers 31 and 32, a unidirection amplifying unit 20, two optical connectors 106, 107, an optical isolator 33 and portions 34, 35 of passive optical fibre.

As shown in FIG. 7, connector 106 is connected to fibre 101 of the selective coupler 31. Connection between fibre 102 of the selective coupler 32 and fibre 102 of the selective coupler 31 is made by a fibre 34 along which an optical isolator 33 is inserted, which optical isolator is adapted to enable propagation of radiation only in the direction from the selective coupler 32 to the selective coupler 31. Connection between fibre 103 of the selective coupler 31 and fibre 104 of the selective coupler 32 is made by means of a fibre 35. The unidirectional amplifying unit 20 is such connected between fibre 104 of the selective coupler 31 and fibre 101 of the selective coupler 32, that the working direction of said unit is the one from the selective coupler 31 to the selective coupler 32. Finally connector 107 is connected to fibre 103 of the selective coupler 32.

The unidirectional amplifying unit 20 and optical connectors 106, 107 are of the same type as those employed in the device described with reference to FIG. 6.

The working wavelengths $\lambda_1$ and $\lambda_2$ in either direction of the bidirectional amplifier are selected within the amplifying band of the unidirectional amplifying unit 20.

The optical isolator 33 is of a type independent of the polarization of the transmission signal, with isolation greater than 35 dB and reflectivity lower than −50' dB.

An appropriate isolator is model DML I-15 PIPT-A S/N 1016 available from ISOWAVE, 64 Harding Avenue, Dover, N.J. (U.S.).

The selective couplers 31 and 32 are selective couplers of the reflection type like those described with reference to FIG. 3A and are such selected that the respective passbands are both contained within the amplifying band of the unidirectional amplifying unit 20. The passbands of the selective couplers 31, 32 comprise wavelengths $\lambda_1$ and $\lambda_2$, respectively. The passbands of the two selective couplers, in addition, do not have overlappings. Wavelengths $\lambda_1$ and $\lambda_2$ are included within the reflected bands of the selective couplers 32, 31, respectively.

Figure 8A:
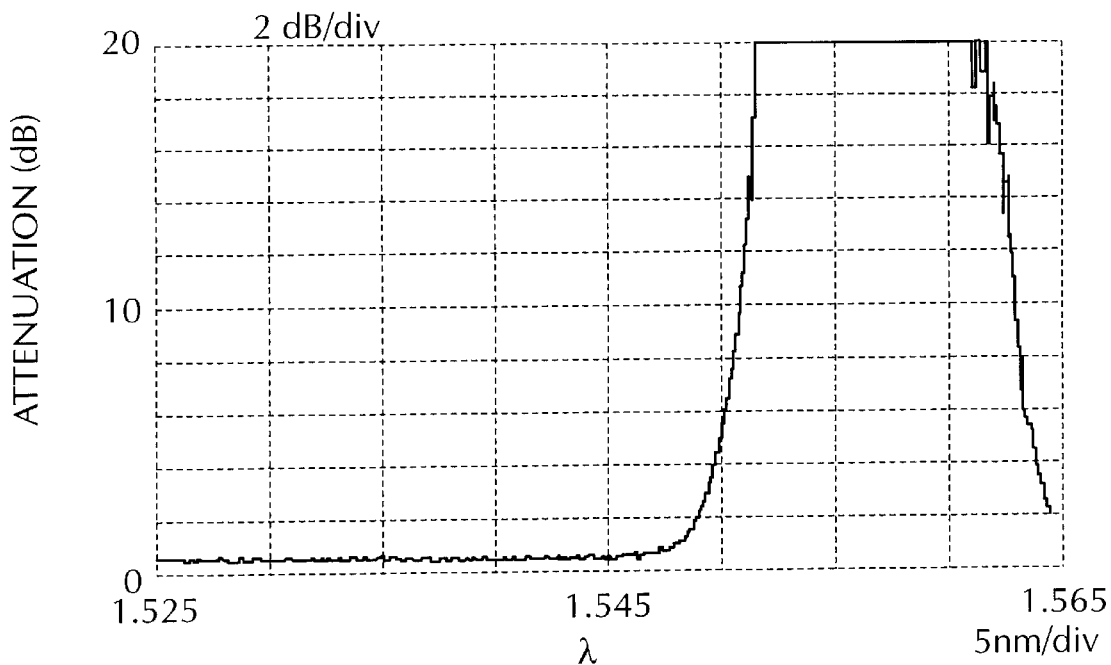
FIG. 8 shows the spectral attenuation curves of the transmitted signals between two pairs of access fibres of a selective reflection coupler of a second type.
Figure 8B:
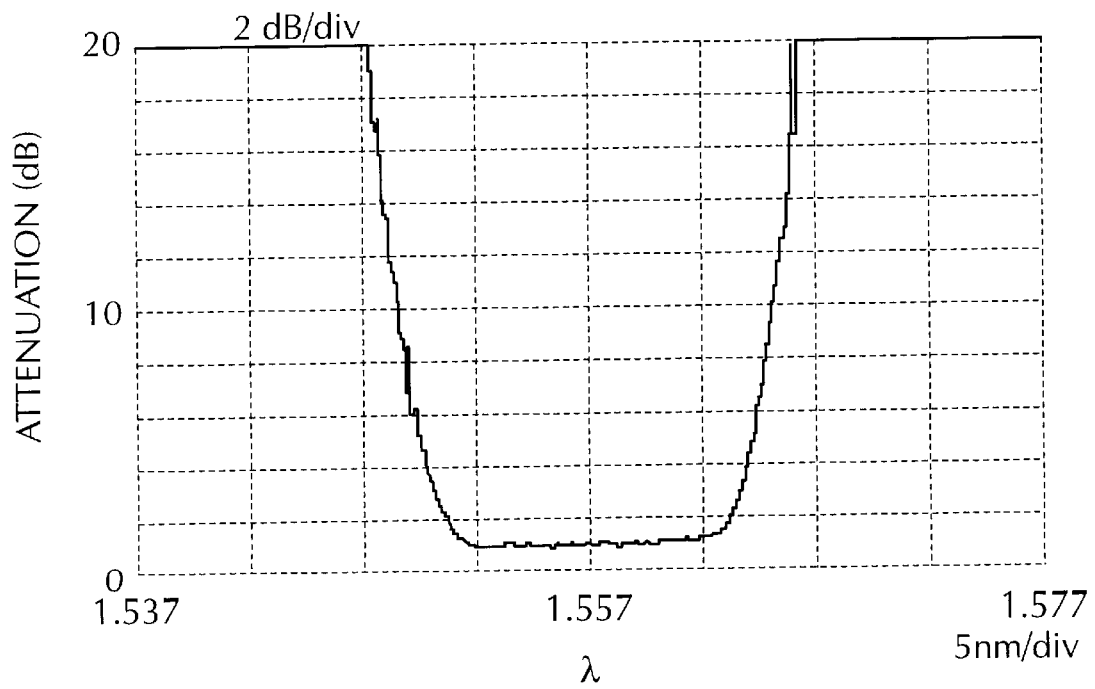

For the selective coupler 31, model WD1515AX-4 can be employed, whereas for the selective coupler 32, model WD1557AY-4 can be employed, both produced by JDS FITEL. The features of the latter, similar to the selective coupler adapted for use in the device of FIG. 6, have already been described. The spectral features of the former are shown in FIGS. 8A and 8B. There are curves similar to those shown in FIGS. 4A and 4B and reference is herein made to the description given for said figures. In particular, the figure of merit (F.O.M.) of the selective coupler in this case too has a value of about 0.5. Unlike the case shown in FIGS. 4A and 4B the wavelength of the centre of the selective coupler passband as far as model WD1515AX-4 is concerned, is about 1557 nm.

Referring to FIG. 7, in the case of the selective coupler 31 one signal at a wavelength $\lambda_1$ internal of the band of the selective coupler inputted to the access fibre 101 is reflected by the selective coupler and comes out of fibre 104; one signal inputted at a wavelength $\lambda_2$ internal of the band of the selective coupler 32 (and therefore external of the selective coupler 31 band) inputted to fibre 103 is transmitted and sent at the output to fibre 101; one input signal to fibre 102, at a wavelength $\lambda_2$ is transmitted and sent at the output to fibre 104.

In the case of the selective coupler 32, in the presence of input signals to the access fibre 101, at wavelengths $\lambda_1$ and $\lambda_2$, the $\lambda_1$ signal passes unchanged through the selective coupler and comes out of fibre 103, whereas the $\lambda_2$ signal is reflected and sent out of fibre 104; an input signal to fibre 103, at a wavelength $\lambda_2$ is reflected and sent out of fibre 102.

The $\lambda_2$ signal from the transmission line through connector 107, is therefore submitted to a reflection (32) and a transmission (31), is amplified in the amplifying unit 20 and again is submitted to a reflection (32) and a transmission (31) before coming out of connector 106. The $\lambda_1$ signal from the transmission line through connector 106, is reflected by the selective coupler 31, amplified and then transmitted through the selective coupler 32, to connector 107.

In this case too therefore, the device is capable of simultaneously amplifying the signals at the two wavelengths in either direction.

The selective couplers in transmission at each passage therethrough, behave as bandpass filters, as shown in FIGS. 4B, 8B, thereby removing the spontaneous emission at the wavelengths intermediate between $\lambda_1$ and $\lambda_2$ propagating together with the signals. On the contrary, at each reflection, the selective couplers behave as band-elimination filters (FIGS. 4A, 8A) and do not attenuate the spontaneous emission.

In each propagation direction therefore, there is at least one passage for a component attenuating the spontaneous emission.

In addition, the optical isolator stops the spontaneous emission propagating from fibre 102 of the selective coupler 31 to fibre 102 of the selective coupler 32 that otherwise should be added, after a reflection, to the $\lambda_2$ output signal from fibre 103 of the selective coupler itself to connector 107.

Figure 9:
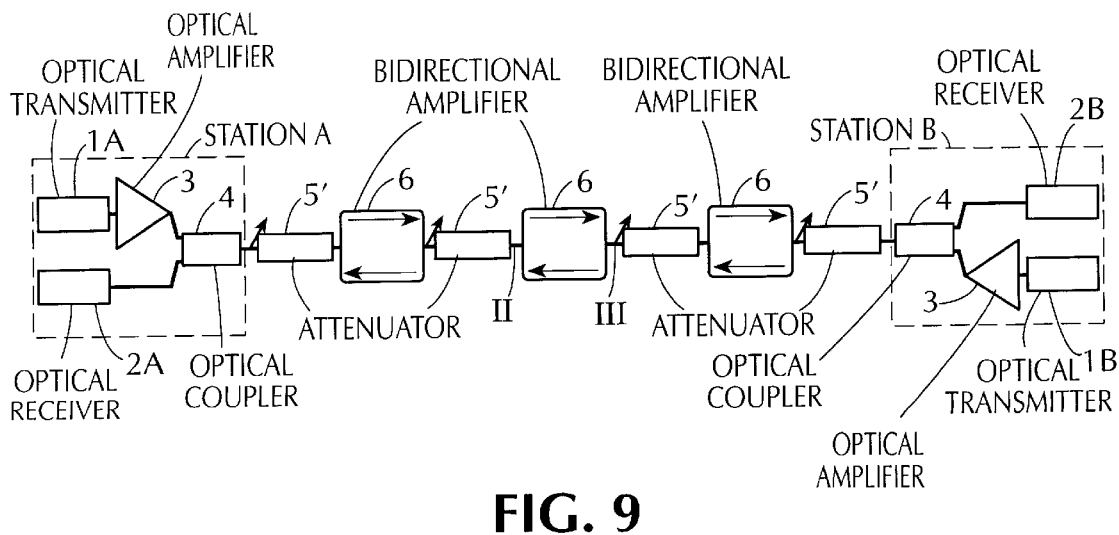
FIG. 9 is a diagram of a transmission line comprising one embodiment of the invention.

The above described device was used in experiments in a connection simulating a transmission line of the same type as described with reference to FIG. 1. The adopted experimental configuration shown in FIG. 9 (wherein the components corresponding to those of FIG. 1 have been allocated identical reference numerals) was comprised of two end stations A and B, three bidirectional amplifiers 6 and four variable attenuators 5'.

In particular, the amplifiers used, denoted by 6, were three bidirectional amplifiers according to the invention, in the configuration described with reference to FIG. 7. Denoted by 5' were four variable attenuators simulating the attenuation of a portion of passive optical fibre. The adopted attenuators were model VA5 produced by JDS FITEL and during the first experiment they were adjusted so as to provide an attenuation of 27 dB each.

The power of the signals propagating in the two directions at wavelengths of 1533 nm and 1556 nm, measured at the respective inputs II and III of amplifier 6 positioned at an intermediate location, was −14 dBm.

Figure 10:
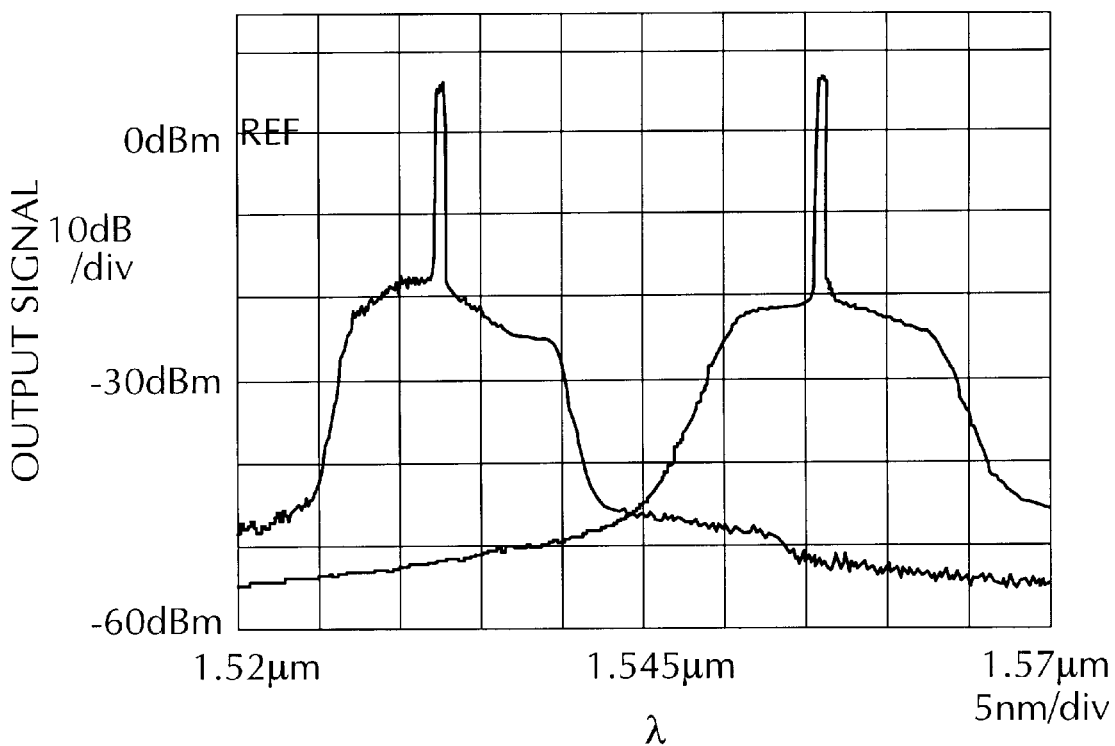
FIG. 10 is a graph showing the overlapped signal spectra at the two outputs of the bidirectional optical amplifier in the transmission line in FIG. 9.

FIG. 10 reproduces the spectra of the output signals from the bidirectional amplifier: the figure was obtained by overlapping of the detected spectra at positions II and III respectively, by an optical spectrum analyzer model MS9030A (Mainframe) and MS9701B (Optical Unit) produced by the above ANRITSU CORP.

The signal/noise ratio measured on a 0.5 nm band was 24.2 dB for the 1533 nm signal and 28 dB for the 1556 nm signal.

Figure 11:
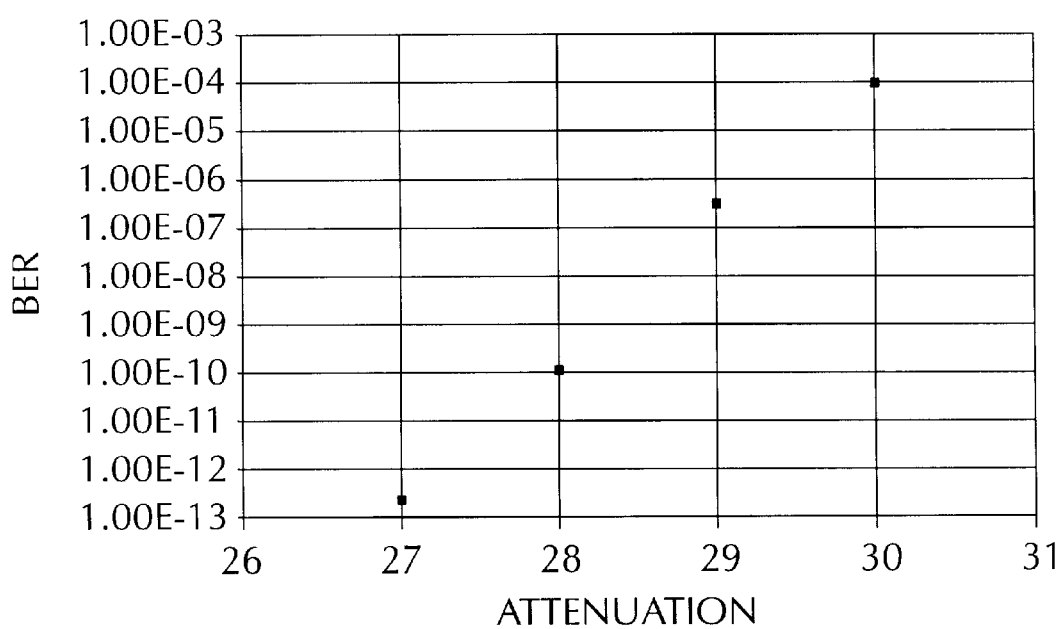
FIG. 11 is a graph of the BER (Bit Error Rate) depending on the attenuation between the amplifiers in the transmission line in FIG. 9.

Another experiment was carried out by varying the attenuation of the variable attenuators 5', under unchanged conditions for all other parameters. For one series of attenuation values, the BER of the transmission line for the 1533 nm signal modulated at 2.5 Gbit/s was measured. The results are shown in FIG. 11, where the BER in the y-axis is represented depending on the attenuation (in dB) between each pair of bidirectional amplifiers in succession: it will be seen that for attenuation values lower than 27 dB, the BER is lower than $10^{-12}$.

An alternative version of a bidirectional optical amplifier according to the present second configuration is achieved by modifying the present configuration by the use of selective couplers 31', 32' such selected that the wavelengths $\lambda_2$, $\lambda_1$ are included in the respective passbands and the wavelengths $\lambda_1$, $\lambda_2$ are included in the respective reflected bands and by the simultaneous reversal of the propagation direction of $\lambda_1$ and $\lambda_2$ signals, that is by connecting the optical connector 106 to the transmission line segment from which the $\lambda_2$ signal comes and the optical connector 107 to the transmission line segment from which the $\lambda_1$ signal comes.

Figure 12:
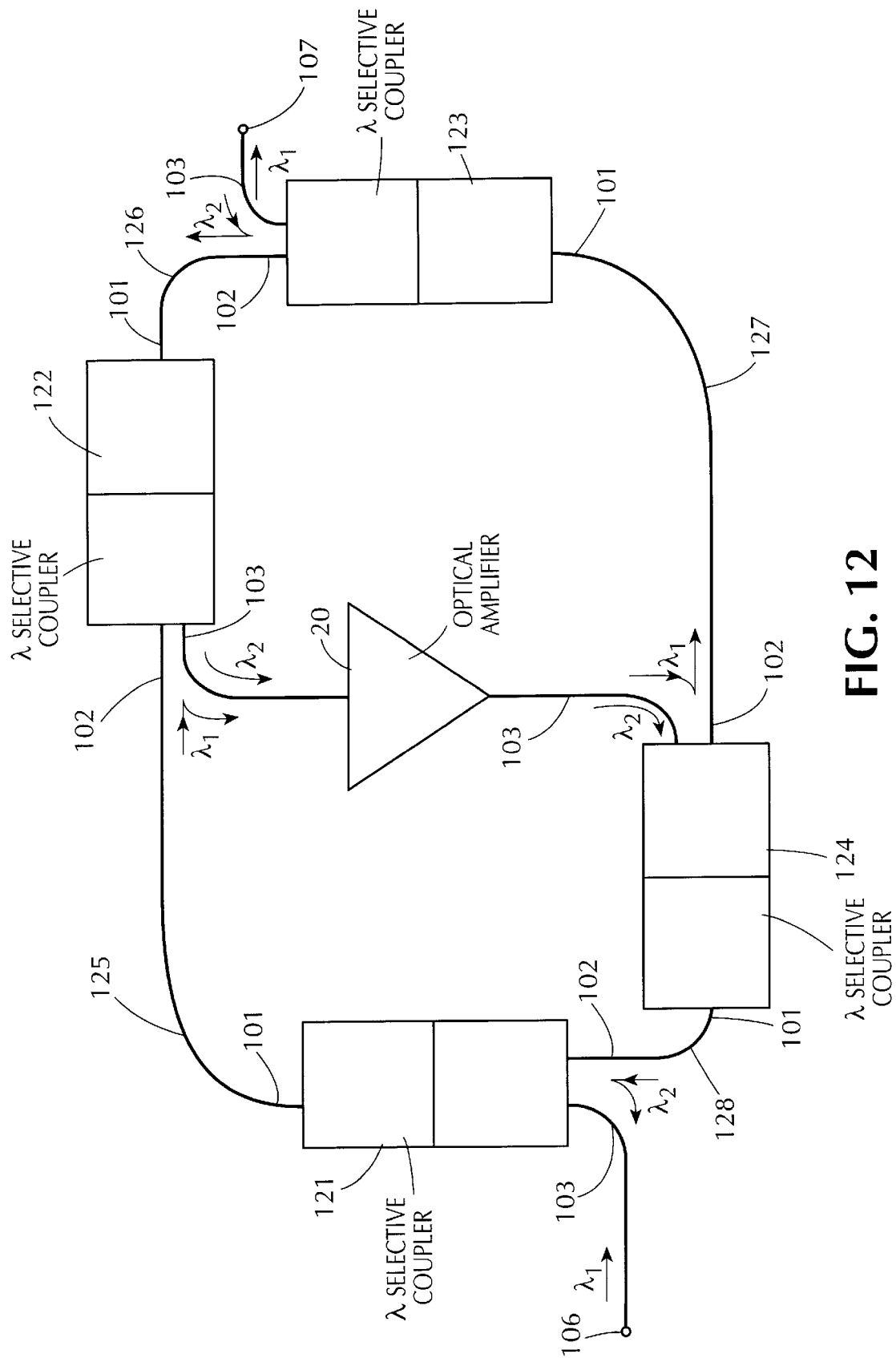
FIG. 12 is a detail diagram of a bidirectional optical amplifier, in a second embodiment of the invention.

Referring to FIG. 12, a third configuration of a bidirectional amplifier used in experiments by the Applicant is comprised of four selective optical couplers 121, 122, 123, 124, one unidirectional amplifying unit 20, two optical connectors 106, 107 and portions 125, 126, 127, 128 of passive optical fibre, the components being connected with each other to form an optical bridge connection.

As shown in FIG. 12, connector 106 is connected to fibre 103 of the selective coupler 121. Connection between fibre 101 of the selective coupler 121 and fibre 102 of the selective coupler 122 is made by means of a fibre 125. Connection between fibre 102 of the selective coupler 121 and fibre 101 of the selective coupler 124 is made by means of a fibre 128. The unidirectional amplifying unit 20 is connected between fibre 103 of the selective coupler 122 and fibre 103 of the selective coupler 124 in such a manner that the working direction of said unit is the one from the selective coupler 122 to the selective coupler 124. Connection between fibre 101 of the selective coupler 122 and fibre 102 of the selective coupler 123 is made by means of a fibre 126. Connection between fibre 102 of the selective coupler 124 and fibre 101 of the selective coupler 123 is made by means of a fibre 127. Finally, connector 107 is connected to fibre 103 of the selective coupler 123.

The unidirectional amplifying unit 20 and optical connectors 106, 107 are of the same type as those used in the devices described with reference to FIGS. 6 and 7.

The working wavelengths $\lambda_1$ and $\lambda_2$ in either direction of the bidirectional amplifier are selected within the amplification band of the unidirectional amplifying unit 20.

The selective couplers 121, 122, 123, 124 are selective couplers of the reflection type as described with reference to FIG. 3A, in a form provided with three access fibres 101, 102, 103. The couplers are such selected that at least part of the respective passbands and at least part of the respective reflected bands is contained in the amplification band of the unidirectional amplifying unit 20. Couplers 121 and 123 are equal to each other and couplers 122 and 124 are equal to each other as well. The passband of the selective couplers 121, 123 comprises the wavelength $\lambda_1$ The passband of the selective couplers 122, 124 comprises the wavelength $\lambda_2$. The passband of the selective couplers 121, 123 in addition does not exhibits overlappings with the passband of the selective couplers 122, 124. The wavelength $\lambda_1$ is included in the reflected band of the selective couplers 122, 124 and the wavelength $\lambda_2$ is included in the reflected band of the selective couplers 121, 123.

As shown in the figure therefore, the couplers that are equal to each other are disposed symmetrically to the two propagation directions of the signals, in the optical bridge connection in which they are inserted: the selective couplers 122 and 124 occupy the vertices of the optical bridge to which the two end portions of the unidirectional amplifying unit 20 are connected, the selective couplers 121 and 123 occupy the vertices of the optical bridge to which the connectors for connection with the transmission line are connected.

As regards the selective couplers 121, 123 for example, model WD1515AY-A3 may be employed, whereas as regards the selective connectors 122, 124, model WD1515AX-A3 may be employed, both of them being produced by JDS FITEL. Model WD1515AY-A3 has already been described and its spectral features are reproduced in FIGS. 4A, 4B. Model WD1515AX-A3 only differs from model 1515AX-4, already described with reference to the second optical-amplifier configuration experimented by the Applicant in the number of the access fibres; the related spectral features are reproduced in FIGS. 8A, 8B. Both of the employed models have a figure of merit (F.O.M.) of about 0.5.

Referring to FIG. 12, in the case of the selective coupler 121, an input signal to the access fibre 103 at a wavelength $\lambda_1$ internal of the selective coupler band, is transmitted to fibre 101, an input signal to fibre 102, at a wavelength $\lambda_2$ is reflected towards fibre 103.

In the case of the selective coupler 122, an input signal to the access fibre 102 at a wavelength $\lambda_1$, external of the selective coupler band, is reflected towards fibre 103; an input signal to fibre 101, at a wavelength $\lambda_2$ is transmitted to fibre 103.

In the case of the selective coupler 123, an input signal to the access fibre 101 at a wavelength $\lambda_1$, internal of the selective coupler band, is transmitted to fibre 103; an input signal to fibre 103, at a wavelength $\lambda_2$ is reflected towards fibre 102.

In the case of the selective coupler 124, an input signal to the access fibre 103 at a wavelength $\lambda_1$ external of the selective coupler band, is reflected towards fibre 102; an input signal to fibre 103, at a wavelength $\lambda_2$ is transmitted to fibre 101.

The $\lambda_1$ signal from the transmission line through connector 106, is transmitted by the selective coupler 121, reflected by the selective coupler 122, amplified by the unidirectional amplifying unit 20, then reflected by the selective coupler 124 and transmitted to connector 107 through the selective coupler 123.

The $\lambda_2$ signal from the transmission line through connector 197, is reflected by the selective coupler 123, transmitted by the selective coupler 122, amplified by the unidirectional amplifying unit 20, then transmitted by the selective coupler 124 and reflected by the selective coupler 121 through connector 106.

In this case too therefore the device is capable of simultaneously amplifying the signals at the two wavelengths in either direction.

The signals at both wavelengths are submitted within the bidirectional amplifier to two transmissions and two reflections each. Since to each reflection and transmission a small attenuation (of about 0.5 dB and 0.7 dB respectively, in the case of the components herein used) corresponds, this equality in the number of passages through the selective couplers ensures a like reply to the amplifier in either propagation direction.

The selective couplers at each passage therethrough in transmission behave as band-pass filters, as shown in FIGS. 4B, 8B, thereby removing the spontaneous emission at the wavelengths intermediate between $\lambda_1$ and $\lambda_2$ propagating together with the signals. At each reflection, instead, the selective couplers behave as band-elimination filters (FIGS. 4A, 8A) and do not attenuate the spontaneous emission.

Therefore, by virtue of the symmetric positioning of the selective couplers relative to the two propagation directions, in each propagation direction the passage of the radiation for a component attenuating the spontaneous emission takes place at least twice.

The present configuration of bidirectional amplifier is particularly stable and free from oscillations at wavelengths different from those of the signal, without additional filters being required. In particular, it is stable with respect to possible partial backreflections of the radiation by the optical connectors 106, 107.

The above described amplifier is particularly convenient in case of use in optical-fibre transmission lines in which the amplifier is connected to the line fibres by means of optical connectors, which connectors can be of the type that, while transmitting most of the power of the signals passing therethrough and therefore ensuring the optical continuity to the signals themselves, under some conditions reflect back a small portion of said signals (for example, in the case of an imperfect clamping, due to a bad positioning of the two fibre terminations within said connectors).

The above described device was tested with decreasing input signal powers, until −28 dB per channel, measuring the corresponding gain, in order to identify the maximum gain under unsaturated conditions of the amplifier; the gain value of small signal which was determined based on such measurements was about 32 dB.

In one experiment the amplifier was tested leaving the optical connectors 106 and 107 open, that is unconnected with the transmission lines. Under these conditions the connectors of the adopted type had a backreflections of the radiation from the amplifier, with an attenuation of 14 dB.

Figure 13:
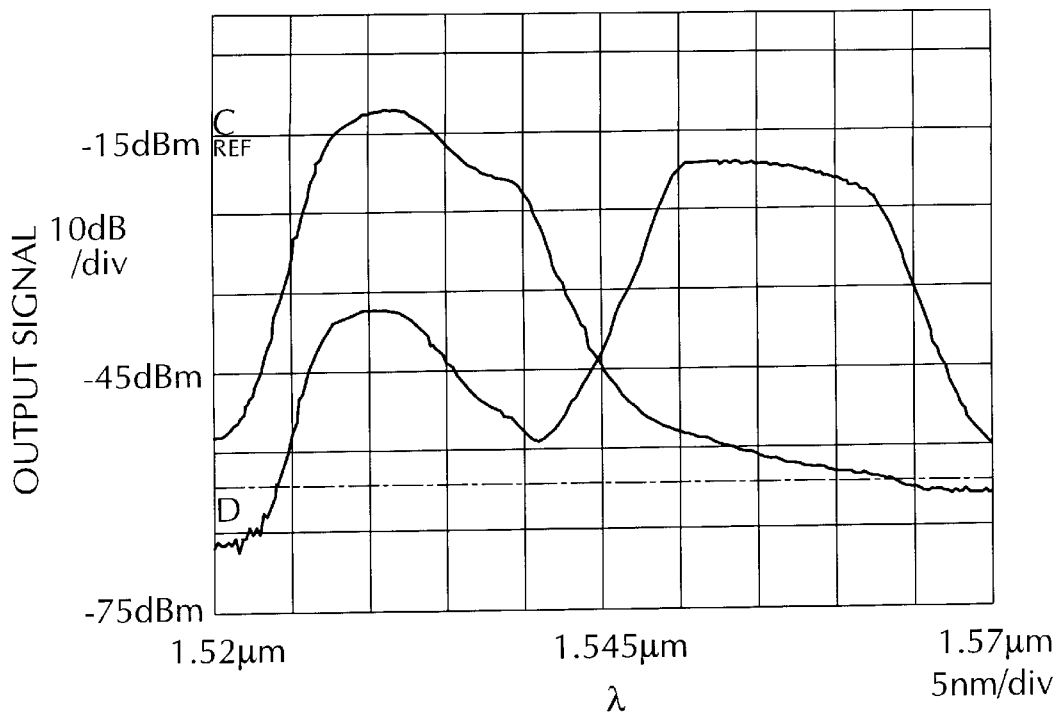
FIG. 13 is a graph showing overlapping of the measured spectra at the two outputs of a bidirectional optical amplifier in the absence of optical input signals.

Shown in FIG. 13 are the spectra of the output signals from fibre 103 of the selective coupler 121 and fibre 103 of the selective coupler 123, detected by wavelength-selective couplers of the same type as above described, located along the fibres themselves (not shown in FIG. 12), separating the respective transmission bands towards an optical-spectrum analyzer (of the above type).

The experiment proved the complete absence of instability phenomena.

This is deemed to be due to the fact that possible feedback loops including the amplifying unit that could be formed for intermediate wavelengths between the passbands of the two types of selective couplers, due to an incomplete separation of the bands by the couplers themselves and in the presence of reflections to the connectors, in each case include at least two passages through components (selective couplers) attenuating said wavelengths by at least 20 dB. Under these conditions even in the presence of very high reflections at the connectors, the conditions involving oscillations are far from being reached.

It is deemed that, with the selective couplers used, even amplifiers having gains of 40 dB do not show oscillation problems even if high-reflectivity connectors are used.

The above described device was also submitted to a second experiment, in a connection simulating a transmission line of the same type as described with reference to FIG. 1. The adopted experimental configuration was the same as described with reference to FIG. 9 and reference is made to this description.

The amplifiers 6 used were three bidirectional amplifiers according to the present invention, in the configuration described with reference to FIG. 12.

The attenuators 5' were adjusted so as to supply an attenuation of 27 dB each.

The power of the signals propagating in the two directions at 1535 nm and 1555 nm wavelengths, measured at the respective inputs II and III of amplifier 6 positioned at a median location, was −13 dBm each.

Figure 14:
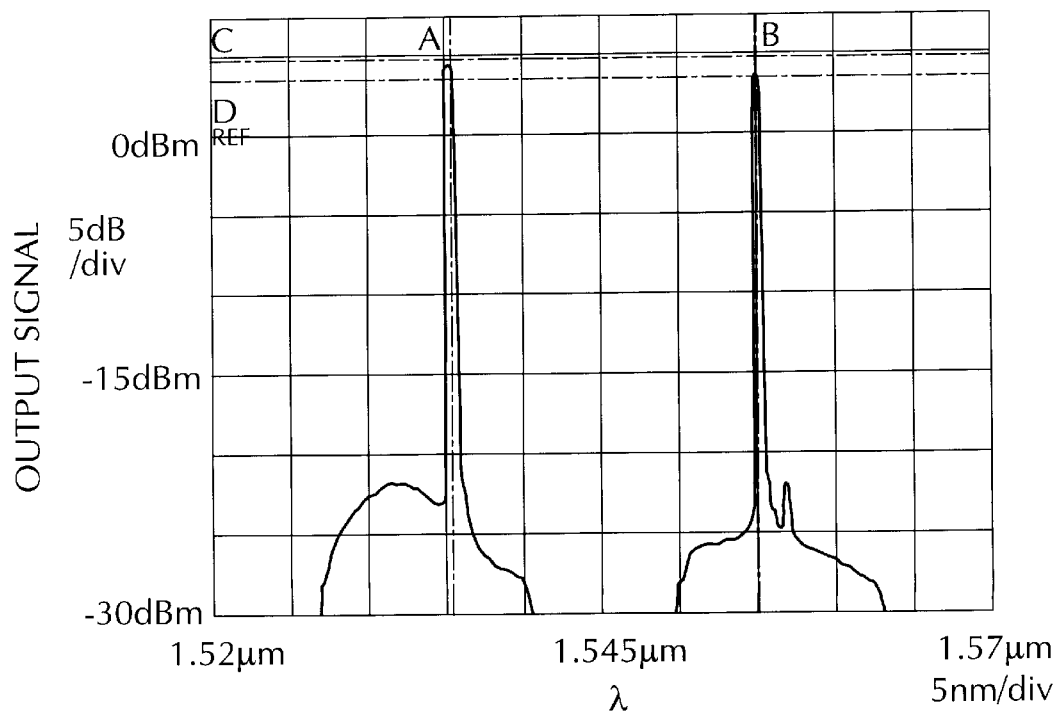
FIG. 14 is a graph showing overlapping of the measured spectra at the two outputs of a bidirectional optical amplifier in the presence of optical input signals.

FIG. 14 reproduces the spectra of the output signals from the bidirectional amplifier: the figure was obtained by overlying the spectra detected at positions II and III respectively, by an optical spectrum analyzer of the above type.

The signal/noise ratio measured on a 0.5 nm band was about 26.7 dB for the 1535 nm signal and about 25.5 dB for the 1555 nm signal.

An alternative version of a bidirectional optical amplifier according to the present third configuration is obtained by modifying the present configuration through the use of selective couplers 121', 122', 123' and 124' such selected that the passband of the selective couplers 122', 124' comprises the wavelength $\lambda_1$; the passband of the selective couplers 121', 123' comprises the wavelength $\lambda_2$; the passband of the selective couplers 121', 123', in addition, does not show overlappings with the passband of the selective couplers 122', 124'; the wavelength $\lambda_1$ is included in the reflected band of the selective couplers 121', 123' and the wavelength $\lambda_2$ is included in the reflected band of the selective couplers 122', 124'; and by the simultaneus reversal of the propagation direction of $\lambda_1$ and $\lambda_2$ signals (that is by connecting the optical coupler 106 to the transmission line segment from which the $\lambda_2$ signal comes and the optical coupler 107 to the transmission line segment from which the $\lambda_1$ signal comes).

The bidirectional amplifiers and bidirectional telecommunication systems according to the present invention have been hitherto described as adapted to the transmission of signals having a different wavelength in each direction.

The same devices and systems however, can be also employed for the bidirectional amplification of signals transmitted according to the WDM (wavelength-division multiplexing) technique, that is in which suitably coded signals at different wavelengths are transmitted in each direction.

In this case it is necessary for the selective couplers used to be selected in such a manner that the respective passbands have a width sufficient to contain the two wavelength groups of the transmitted signals in each direction.

In addition, the figure of merit (F.O.M.) of the selective couplers should be sufficiently high to enable the selective couplers to separate the signals of the two wavelength groups and preferably of a value greater than 0.5.

In addition to the described selective-reflection couplers with reference to FIG. 3A, the present invention can provide for the use of selective couplers of a wavelength of another type, provided that they ensure a sufficient separation between the wavelengths used and therefore a sufficiently high value of the figure of merit (F.O.M.)

In greater detail, as shown in FIG. 15, a unidirectional amplifying unit 20 provided for use in a bidirectional optical amplifier comprises one erbium-doped active fibre 24, and a related pump laser 25, connected thereto through a dichroic coupler 26; one optical isolator 27 is located at the amplifier input upstream of the fibre 24 in the travel direction of the signal to be amplified, whereas a second optical isolator 28 is located at the amplifier output.

In an alternative embodiment, the amplifier may be a two-stage amplifier; in this case it further comprises a second erbium-doped active fibre, associated with a related pump laser through a dichroic coupler; conveniently a further optical isolator is present between the two stages.

In the above described preferred example, the pump laser 25 is preferably a laser of the Quantum Well type, having the following features:

| | |
|---|---|
| emission wavelength | $\lambda_p = 980$ nm; |
| maximum optical output power | $P_u = 65$ mW. |

Lasers of the above type are produced for example by LASERTRON INC., 37 North Avenue, Burlington, Mass. (U.S.).

In this example the dichroic coupler 26 is a melted-fibre coupler, formed of single-mode fibres at 980 nm and in the 1530–1560 nm wavelength band, with a <0.2 dB variation of the optical output power depending on polarization.

Dichroic couplers of the above type are known and commercially available and produced for example by GOULD INC., Fibre Optic Division, Baymeadow Drive, Glem Burnie, Md. (U.S.), and SIFAM LTD., Fibre Optic Division, Woodland Road, Torquay, Devon (GB).

The optical isolators 27 and 28 are optical isolators of a type independent of the transmission signal polarization, with isolation greater than 35 dB and reflectivity lower than −50 dB. Adapted isolators are model MDLI-15PIPT-A S/N 1016 of the above ISOWAVE.

The above described line amplifier has a gain of about 25 dB, under normal operation conditions (input signals with −23 dBm power in each direction, corresponding to −20 dBm in all). The overall optical output power under saturation conditions is about 11 dB.

In a preferred embodiment in the line amplifiers of the above described type an erbium-doped active fibre is used, as described in detail in the Italian Patent Application No. MI94A 000712 of Apr. 14, 1994 of said assignee which is herein incorporated by reference and the contents of which are hereinafter summarized.

The composition and optical features of the fibre used are summarized in the following table 2.

In order to carry out a check on the functionality of the amplifying unit and provide the usually required check and safety signals, conveniently the amplifying unit at the input comprises one directional coupler 150 preferably with a 95/5 separation ratio the output of which carrying 5% of the input power is sent to a related photodiode 151; a second directional coupler 152, preferably with a 99/1 separation ratio, is further present at the output of the amplifying unit, with a fibre carrying 1% of the signal connected to a respective photodiode 153.

Appropriate directional couplers are melted-fibre couplers, available for example from E-TEK DYNAMICS INC., 1885 Lundy Ave., San Jose, Calif. (U.S.).

The electric outlets of photodiodes 151 and 153 are sent to an electronic control unit not shown as conventional.

This configuration enables checking on the functionality of the amplifying unit to be achieved and the required safety devices to be managed. However, if used in the above described bidirectional configuration, it does not offer separate information on the signal propagating in the two directions.

For the purpose of enabling the simultaneous checking of the optical input and output powers to and from the amplifier in the two directions, the use of the structure shown in FIG. 16 is provided.

As shown in said figure, a bidirectional amplifier 6, of the previously described type, comprising an optical amplifying

TABLE 2

| Fibre | $Al_2O_3$ wt % | (mol %) | $GeO_2$ wt % | (mol %) | $La_2O_3$ wt % | (mol %) | $Er_2O_3$ wt % | (mol %) | NA | $\lambda_c$ nm |
|---|---|---|---|---|---|---|---|---|---|---|
| A | 4 | (2.6) | 18 | (11.4) | 1 | (0.2) | 0.2 | (0.03) | 0.219 | 911 | wherein
wt = (average) percent content by weight of oxide in the core
mol% = (average) percent content by mole of oxide in the core
NA = Numerical Aperture $(n1^2 - n2^2)^{1/2}$
$\lambda_c$ = Cut-off wavelength (LP11 cut-off).

Analyses of the compositions were made on a preform (before spinning of the fibre) by a microprobe combined with a scanning electron microscope (SEM Hitachi); analyses were conducted at 1300 magnifications on discrete points disposed along a diameter and separated by 200 μm from each other.

The stated fibre was made following the technique of the vacuum plating, within a quarz glass tube.

The incorporation of germanium as the dopant into the $SiO_2$ matrix in the fibre core is obtained during the synthesis step.

The incorporation of erbium, alumina and lanthanum into the fibre core was obtained by the "doping-in-solution" technique, in which an aqueous solution of the dopant chlorides is brought into contact with the synthesis material of the fibre core, while it is in a particulate state, before hardening of the preform.

More details on the "doping-in-solution" technique can be found for example in U.S. Pat. No. 5,282,079, which is herein incorporated by reference.

In the previously described examples the active fibre 24 was about 12 m long.

While the best results have been achieved with the use of the above fibre, by virtue of the flat gain curve it exhibits at the different wavelengths, experiments conducted by the Applicant with amplifiers using fibres of the Al/Ge type have shown acceptable results.

unit devoid of check devices, as shown in block 154 of FIG. 15, is connected between two directional couplers 155 and 156, conveniently with a 92/8 separation ratio; the outputs of the couplers carrying the smallest optical power (2%) are connected to respective check photodiodes 157, 158, 159, 160.

Appropriate directional couplers are melted-fibre couplers, commercialized by the above E-TEK DYNAMICS, for example.

As shown in the diagram of FIG. 16, the directional couplers have four input/output ports, disposed symmetrically: in this manner, a $\lambda_1$ wavelength signal (propagating from left to right, in the diagram), inputted to the coupler 155, is shared out in the stated ratio between the output port connected to the amplifier 6 (98%) and the output port connected to the photodiode 158 (2%); likewise, the same $\lambda_1$ wavelength signal inputted to the coupler 156, is shared out between the output port connected to the line (98%) and the output port connected to the photodiode 159 (2%).

This enables the optical power value at $\lambda_1$ wavelength inputted to the amplifier to be measured at the photodiode 158 and the optical power value at $\lambda_1$ wavelength outputted from the amplifier to be measured at the photodiode 159, thereby obtaining a complete information on the functionality of the channel propagating from right to left; in the same manner, at the photodiodes 160 and 157 the input and output optical powers are respectively measured at the wavelength $\lambda_2$ of the signal propagating from right to left in the diagram.

The separation ratio of each directional coupler has the same value in both directions, due to the symmetry features of the couplers. Said value is selected so as to separate a sufficient power from the transmission line towards the photodiodes 158, 160 detecting the relatively low power inputted to the amplifier in each direction, without penalizing the output power from the amplifier too much (a high overall power being available at the amplifier output, it is sufficient to separate a small fraction of same in order that the photodiodes 157, 159 can be reached by a power sufficient to operation of same).

When for the counterpropagating channels, wavelengths $\lambda_1$ and $\lambda_2$ in the neighbourhood of 1533 and 1556 nm and wavelength-selective couplers with a passband about 10 nm wide are used, it is desirable for said selective couplers to have a figure of merit (F.O.M.) of about 0.5.

In the presence of a passband width at −0.5 dB greater than 10 nm, a correspondingly higher figure of merit (F.O.M.) for the selective couplers will be required.

According to one aspect of the present invention therefore, it has been found that a bidirectional optical fibre amplifier of the above type for two or more counterpropagating wavelength-separated channels can be made in the absence of instability or oscillation by disposing an amplifying unit including an optical isolator in a bridge connection comprising two wavelength-selective couplers having a first passband and two wavelength-selective couplers having a second passband in which the selective couplers are disposed symmetrically to the amplifier.

In a particular embodiment, the present invention can also apply to a transmission line including several channels for each transmission direction, provided that the channels for each direction are included in the passband of the selective couplers with a sufficient separation between said channels.

In one aspect of the present invention therefore, it has been found that the occurrence of oscillation phenomena in an amplifier of the bidirectional type can be inhibited, also in the presence of high gain values of the amplifying unit included therein and in the presence of localized reflections at particular positions of the optical circuit, for example due to the use of optical connectors of relatively high reflectivity, when the selective connectors used have such an arrangement that for any wavelength no loops are formed which include the amplifying unit with an overall attenuation less than or equal to the maximum gain of the amplifier or the amplifying unit included thereinto.

In particular, this can be achieved by such an arrangement of the components in the optical amplifier circuit that each signal propagating in one direction encounters reflections and transmissions in the selective optical couplers, in the same sequence.

We claim:

1. A bidirectional optical amplifier, adapted to be interposed in an optical line carrying first and second counterpropagating signals, said first and second optical signals having respective first and second wavelengths which are different and spaced from each other, said bidirectional optical amplifier comprising:
   a unidirectional optical amplifying unit including an input and an output and having an amplification wavelength band including said first and second wavelengths;
   first and second input/output ports for coupling to said optical line;
   two first type wavelength-selective couplers having a first wavelength pass-band including said first wavelength and excluding said second wavelength;
   two second type wavelength-selective couplers having a second wavelength pass-band including said second wavelength and excluding said first wavelength; and
   wherein said first and second type couplers are mutually coupled to define a bridge circuit having two opposite first nodes defined by said first type couplers and opposite second and third nodes defined by said second type couplers, said unidirectional optical amplifying unit being interposed between said first nodes, said first input/output port being coupled to said second node and said second input/output port being coupled to said third node.

2. A bidirectional optical amplifier according to claim 1, characterized in that said amplifying unit includes at least one erbium-doped optical fibre.

3. A bidirectional optical amplifier according to claim 2, characterized in that said doped optical fibre comprises alumina and germanium among the dopants.

4. A bidirectional optical amplifier according to claim 3, characterized in that said doped optical fibre comprises alumina, germanium and lanthanum among the dopants.

5. A bidirectional optical amplifier according to claim 2, characterized in that said pass-band of each of the first and second type selective couplers advantageously is at least 10 nm wide.

6. A bidirectional optical amplifier according to claim 1, characterized in that at least one of said pass-bands comprises at least two signals of distinct wavelengths.

7. A bidirectional optical amplifier according to claim 1, characterized in that the wavelength-selective couplers have a figure of merit equal to or higher than 0.5.

8. A bidirectional optical amplifier according to claim 1, wherein said two first nodes, said second node and said first input/output port, when said first input/output port has a first reflectivity greater than zero, provide a first optical path;
   wherein said two first nodes, said third node and said second input/output port, when said second input/output port has a second reflectivity greater than zero, provide a second optical path; and
   wherein, for each wavelength in said amplification band, each of said first and second optical paths provide, when at least one of said first and second reflectivities has a value of at least −15 dB, an attenuation that is greater than the amplification provided by said unidirectional optical amplifying unit.

9. A bidirectional telecommunication method, comprising the steps of:
   generating a first optical signal and a second optical signal, at first and second different wavelengths respectively, in a first and a second transmitting station;
   introducing said first and second signals into the opposite ends of an optical fiber of a telecommunication line, respectively;
   amplifying said first and second signals at least once in an optical amplifier disposed intermediate the ends of the line;
   receiving said first and second signals at respective first and second reception stations, respectively, at the opposite ends of said optical fiber relative to said first and second transmitting stations; and
   wherein said amplifying step comprises:
      amplifying said first and second signals in a unidirectional optical amplifying unit including an optical fiber amplifying unit comprising an optical isolator;
      transmitting said first and second signals at least once through first wavelength-selective optical couplers of first and second types, respectively, wherein the wavelength-selective optical couplers of the first type have a first wavelength transmission band comprising said first wavelength and which excludes said second wavelength and wherein the wavelength-selective optical couplers of the second type have a second wavelength transmission band comprising said second wavelength and which excludes said first wavelength; and reflecting said first and second signals at least once at second wavelength-selective optical couplers of the first and second types, respectively, wherein the wavelength-selective optical couplers of the first type have a first wavelength reflection band comprising said second wavelength and which excludes said first wavelength and wherein the wavelength-selective optical couplers of the second type have a second wavelength reflection band comprising said first wavelength and which excludes said second wavelength, wherein said wavelength-selective optical couplers are coupled in series to form two opposite first nodes defined by said first type couplers and opposite second and third nodes defined by said second type couplers, wherein said unidirectional optical amplifying unit is interposed between said first nodes, wherein said first transmitting and reception stations are coupled to said second node, wherein said second transmitting and reception stations are coupled to said third node and wherein said transmitting and reflecting steps are performed symmetrically with respect to the unidirectional optical amplifying unit for said first and second signals.

10. A bidirectional optical amplifier comprising:

a unidirectional optical amplifying unit for amplifying optical signals in an amplification wavelength band and having an input and an output;

a first and a second optical input/output port for a first and a second optical signal having opposite propagation directions, said first and second signals having a first and a second wavelength respectively, which wavelengths are different and spaced from each other and included in said amplification wavelength band;

two wavelength-selective optical couplers of a first type, having a first wavelength pass-band comprising said first wavelength and which excludes said second wavelength;

two wavelength-selective optical couplers of a second type, having a second wavelength pass-band comprising said second wavelength and which excludes said first wavelength;

wherein said optical couplers are coupled in series to form a bridge circuit with opposite first and second nodes between pairs of couplers and opposite third and fourth nodes spaced from said first and second nodes and between pairs of couplers;

wherein said unidirectional optical amplifying unit is coupled between said opposite first and second nodes, said first input/output port is coupled to said third node, said second input/output port is coupled to said fourth node;

wherein said bridge circuit and said unidirectional amplifying unit provide;

a first optical path comprising said first node and said third node;

a second optical path comprising said third and said second nodes;

a third optical path comprising said first and said fourth nodes;

a fourth optical path comprising said fourth and said second nodes;

characterized in that said wavelength-selective couplers are coupled and selected so that the sum of the attenuations along said first and second path and the sum of the attenuations along said third and fourth path are each greater than a gain of said unidirectional optical amplifying unit at each wavelength in said amplifying band, by at least 15 dB.

11. A bidirectional optical amplifier, adapted to be interposed in an optical line carrying first and second counter-propagating signals, said first and second optical signals having respective first and second wavelengths which are different and spaced from each other, said bidirectional optical amplifier comprising:

a unidirectional optical amplifying unit including an input and an output and having an amplification wavelength band including said first and second wavelength;

first and second input/output ports for coupling to said optical line;

first, second, third and fourth wavelength-selective optical couplers, each having first, second and third access fibers;

wherein the first access fiber of said first coupler is coupled to the second access fiber of said second coupler, the second access fiber of said first coupler is coupled to the first access fiber of said fourth coupler, the third access fiber of said first coupler is coupled to said first input/output port, the first access fiber of said second coupler is coupled to the second access fiber of said third coupler, the third access fiber of said second coupler is coupled to the input of said unidirectional optical amplifying unit, the first access fiber of said third coupler is coupled to the second access fiber of said fourth coupler, the third access fiber of said third coupler is coupled to said second input/output port and the third access fiber of said fourth coupler is coupled to the output of said unidirectional optical amplifying unit;

wherein the first and the third couplers are of a first type and define low-attenuation paths between their respective first and third access fibers for the first signal and between their respective second and third access fibers for the second signal; and wherein the second and the fourth couplers are of a second type and define low-attenuation paths between their respective first and third access fibers for the second signal and between their respective second and third access fibers for the first signal.

12. A bidirectional optical amplifier comprising:

first and second input/output ports;

a unidirectional optical amplifying unit having an amplification band and including an input and an output;

first and second wavelength-selective optical couplers, each having respective first, second, third and fourth access fibers for the input/output of signals;

wherein said first access fiber of said first coupler is optically coupled to said input port, said second access fiber of said first coupler is optically coupled to said second access fiber of said second coupler, said third access fiber of said first coupler is optically coupled to the input of said unidirectional optical amplifying unit, said fourth access fiber of said first coupler is optically coupled to said fourth access fiber of said second coupler, said first access fiber of said second coupler is optically coupled to the output of said unidirectional optical amplifying unit and said third access fiber of said second coupler is optically coupled to said second input/output port; and wherein said first and second couplers define a low-attenuation path between their respective first and third access fibers for a first optical signal having a first wavelength included in said amplification band, and define low-attenuation paths between their respective second and third access fibers and between their respective first and fourth access fibers for a second optical signal having a second wavelength included in said amplification band and different from said first wavelength.

13. A bidirectional amplifier comprising:

first and second input/output ports;

a unidirectional amplifying unit having an amplification band and including an input and an output;

first and second wavelength-selective optical couplers, each having respective first, second, third and fourth access fibers for the input/output of signals;

wherein said first access fiber of said first coupler is optically coupled to said input port, said third access fiber of said first coupler is optically coupled to said fourth access fiber of said second coupler, said fourth access fiber of said first coupler is optically coupled to the input of said unidirectional optical amplifying unit, said first access fiber of said second coupler is optically coupled to the output of said unidirectional amplifying unit, said second access fiber of said second coupler is optically coupled to said second access fiber of said first coupler and said third access fiber of said second coupler is optically coupled to said second input/output port;

wherein said first coupler defines a low-attenuation path from the first to the fourth access fibers of the first coupler for a first optical signal having a first wavelength included in said amplification band, and defines low-attenuation paths from the second to the fourth access fiber of the first coupler and from the third to the first access fiber of the first coupler for a second optical signal having a second wavelength included in said amplification band and different from said first wavelength; and wherein said second coupler defines a low-attenuation path from the first to the third access fiber of the second coupler for said first optical signal, and defines low-attenuation paths from the first to the fourth access fibers of the second coupler and from the third to the second access fiber of the second coupler for said second optical signal.

14. A bidirectional optical amplifier according to claim 13 further comprising an optical isolator coupled between said second access fiber of said second coupler and said second access fiber of said first coupler and permitting signals to pass substantially only in the direction from said second coupler to said first coupler.

* * * * *

UNITED STATES PATENT AND TRADEMARK OFFICE
CERTIFICATE OF CORRECTION

PATENT NO.    : 5,995,259
DATED         : November 30, 1999
INVENTOR(S)   : Meli et al.

It is certified that error appears in the above-identified patent and that said Letters Patent is hereby corrected as shown below:

Abstract,
Line 4, change "said" to -- the --;
Line 8, after "couplers," insert -- respectively --;
Line 11, cancel "respectively"; change "said" to -- the --;
Line 12, cancel "devoid of relative"; change "overlappings" to -- non-overlapping --; and change "said" to -- the --;
Line 15, change "said to -- the --;
Line 16, change "in which said first and second selective optical couplers" to -- and --;
Line 17, change "said" to -- the --;
Line 18, change "said" to -- the --.

Column 1,
Line 39, change "applicant" to -- application --;

Column 6,
Lines 61 and 62, change "dbm" to -- dBm --;

Column 7,
Line 25, change "kr" to $\lambda r$ --;

Column 10, Table 1,
Line 32, change "dbm" to -- dBm --.

Signed and Sealed this

Sixteenth Day of October, 2001

Attest:

NICHOLAS P. GODICI
Attesting Officer     Acting Director of the United States Patent and Trademark Office